United States Patent
Wang et al.

(10) Patent No.: US 9,755,893 B2
(45) Date of Patent: *Sep. 5, 2017

(54) PROVISIONING VIRTUAL OPTICAL NETWORKS

(71) Applicant: FUJITSU LIMITED, Kawasaki-shi, Kanagawa (JP)

(72) Inventors: Qianqian Wang, Atlanta, GA (US); Mukul R. Prasad, San Jose, CA (US); Indradeep Ghosh, Cupertino, CA (US); Xi Wang, Murphy, TX (US); Paparao Palacharla, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 221 days.

This patent is subject to a terminal disclaimer.

(21) Appl. No.: 14/619,029

(22) Filed: Feb. 10, 2015

(65) Prior Publication Data
US 2016/0234061 A1 Aug. 11, 2016

(51) Int. Cl.
*G06F 15/16* (2006.01)
*H04L 12/24* (2006.01)

(52) U.S. Cl.
CPC ...... *H04L 41/0803* (2013.01); *H04L 41/0806* (2013.01); *H04L 41/12* (2013.01)

(58) Field of Classification Search
CPC .. H04B 10/27; H04L 41/0806; H04L 41/0896
USPC ........................................................ 709/220
See application file for complete search history.

(56) References Cited

U.S. PATENT DOCUMENTS

| | | | |
|---|---|---|---|
| 2014/0068045 A1* | 3/2014 | Tarui | H04L 41/02 709/223 |
| 2015/0036541 A1* | 2/2015 | Xu | H04L 41/0226 370/254 |
| 2015/0104166 A1* | 4/2015 | Patel | H04Q 11/0066 398/5 |
| 2015/0104172 A1* | 4/2015 | Wang | H04J 14/0254 398/58 |

(Continued)

OTHER PUBLICATIONS

Fischer et al., Virtual Network Embedding: A Survey, IEEE Communications Surveys and Tutorials, 15(4):1888-1906, 2013.*

(Continued)

*Primary Examiner* — Tauqir Hussain
(74) *Attorney, Agent, or Firm* — Maschoff Brennan

(57) ABSTRACT

A method of provisioning a network may include receiving a mapping solution for one or more virtual optical network (VON) requests including virtual nodes and virtual links. The mapping solution may include one mapping pattern for each VON request and each mapping pattern may include an ordered list of physical nodes. The method may also include formulating inequality constraint equations based on physical links that are shared by multiple virtual links. The method may also include formulating range constraint equations for each virtual link based on a physical link for each virtual link with a lowest number of optical transmission slots such that each virtual link occupy a same optical transmission slot across all physical links that are traversed by the virtual link. The inequality and range constraint equations may be solved with satisfiability modulo theories to obtain a slot assignment solution.

20 Claims, 13 Drawing Sheets

(56) References Cited

U.S. PATENT DOCUMENTS

2016/0043911 A1\* 2/2016 Finkelstein ....... G06F 17/30286
                                                          709/224

OTHER PUBLICATIONS

Wang et al., "Flexible Virtual Network Provisioning over Distance-Adaptive Flex-Grid Optical Networks", OFC 2014, Journal of Optical Communications and Networking, 7:A318-A325.\*
Pages et al., "Optimal allocation of virtual optical networks for futme internet", ONDM 2012, 6 pages.\*
Xie et al., "Survivable Virtual Optical Network Mapping in Flexible-Grid Optical Networks", ICNC 2014, pp. 221-225.\*

\* cited by examiner

PROVISIONING VIRTUAL OPTICAL NETWORKS

The disclosure of U.S. patent application Ser. No. 14/491,702 filed on Sep. 19, 2014 and titled "VIRTUAL OPTICAL NETWORK PROVISIONING BASED ON MAPPING CHOICES AND PATTERNS" is incorporated herein by reference in its entirety.

FIELD

The embodiments discussed herein are related to provisioning virtual optical networks.

BACKGROUND

Telecommunication, cable television, and data communication systems use optical networks to rapidly convey large amounts of information between remote points. In an optical network, information is conveyed in the form of optical signals through optical fibers, also referred to as a lightpath.

Software-defined networking (SDN) represents an important step towards network virtualization and abstraction and may allow a logical network entity to be instantiated automatically using software instructions. In this manner, SDN may enable flexible definitions of virtual networks. For example, using the OpenFlow communications protocol managed by The Open Network Foundation (ONF), a traffic flow entity may be instantiated using an arbitrary combination of layer identifiers defined in a header space. OpenFlow may use various combinations of traffic identifiers (Internet-protocol (IP) addresses, media access controller (MAC) addresses, port addresses, etc.) at various layers to define a traffic flow. Then, by installing and configuring packet-forwarding rules associated with the flow to physical switches, an OpenFlow controller may ensure that the traffic flow entity instantiates a path that is routed through a network including the physical switches.

FlowVisor, a network virtualization layer of OpenFlow, may instantiate a virtual network entity (called a "slice") by associating multiple traffic flow entities with a given slice, whereby each slice is managed by a separate tenant controller, allowing the tenant control over a portion of network traffic and a subset of the physical network. In OpenFlow, multiple flowspaces may be defined for each network switch. Each flowspace may be associated with a slice, which in turn is managed by a separate controller. FlowVisor may ensure that actions in one slice do not affect another by intercepting and rewriting OpenFlow messages.

The principles and features of SDN technologies were initially deployed with a focus on internet protocol (IP) and Ethernet networks. However, the concept of SDN may be introduced to optical networks as well. For example, the SDN concept may be applied to agile optical networks built using colorless/directionless/flex-grid reconfigurable optical add-drop multiplexers (ROADMs) and programmable transponders for multiple modulation formats. An SDN-enabled optical network may be referred to as a Software-Defined Optical Network (SDON), which may be more open, programmable, and application aware. A feature of SDON is optical network virtualization, which may enable network service providers to provision multiple coexisting and isolated virtual optical networks (VONs) over the same physical infrastructure. For example, in conventional optical networks, network services are provided in terms of light-paths (i.e., optical network paths between given endpoints). In SDONs, network services may be provided in terms of VONs. When provisioning VONs in response to a request, different mapping patterns for mapping VONs to a physical network may be possible.

Accordingly, network services may be provided as virtual optical networks (VONs) in a SDON in place of conventional lightpaths. VON provisioning may be distinguishable from conventional lightpath provisioning in certain aspects. For example, a lightpath may be a point-to-point connection, while a VON may include a network of multiple virtual nodes and virtual links. Each virtual node in a VON may be mapped to a physical node of a physical network, while each virtual link in a VON may be mapped to one or more physical links connecting the physical nodes. In certain embodiments, virtual links for a particular VON may be provisioned collectively, rather than individually. In this manner, a VON request may be served when all virtual links have been successfully mapped to physical links under the desired criteria for the VON request.

Furthermore, a particular lightpath may have a fixed source and destination node. In a VON, the virtual node to physical node mapping may be flexible. For example, a virtual node may be mapped to any physical node within a certain geographic area or among a certain number of specified physical nodes, as long as a resulting physical SDON slice satisfies the service-level agreement of the VON. Such flexibility may empower a network service provider to optimize resource usage and reduce service provisioning costs.

VON provisioning may generalize the concept of optical networking service from point-to-point fixed-node-pair lightpath provisioning to multi-point flexible-nodes, or group optical network slicing. Because a lightpath may be a particular instance of a VON including two virtual nodes, each with a fixed node mapping, an SDON service provider may have backward-compatibility to lightpath provisioning with little to no modification of its VON service provisioning system.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving a mapping solution for one or more virtual optical network (VON) requests including virtual nodes and virtual links The mapping solution may include one mapping pattern for each VON request and each mapping pattern may include an ordered list of physical nodes. Each physical node in the ordered list may be connected to adjacent physical nodes in the ordered list by physical links. The method may also include formulating inequality constraint equations based on physical links that are shared by multiple virtual links. The inequality constraint equations may require each virtual link that traverses a shared physical link to occupy a unique optical transmission slot over the shared physical link. The method may also include formulating range constraint equations for each virtual link that may specify a set of optical transmission slots to which a given virtual link of a given VON request may be assigned. Further, the method may also include formulating cost constraint equations that may enforce assigning virtual links to the lowest possible slots so as to maximize the number of VON requests that may be provisioned on a given physical optical network. The inequality, range, and cost function constraint equations may be solved with satisfiability modulo theories to obtain a slot assignment solution.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
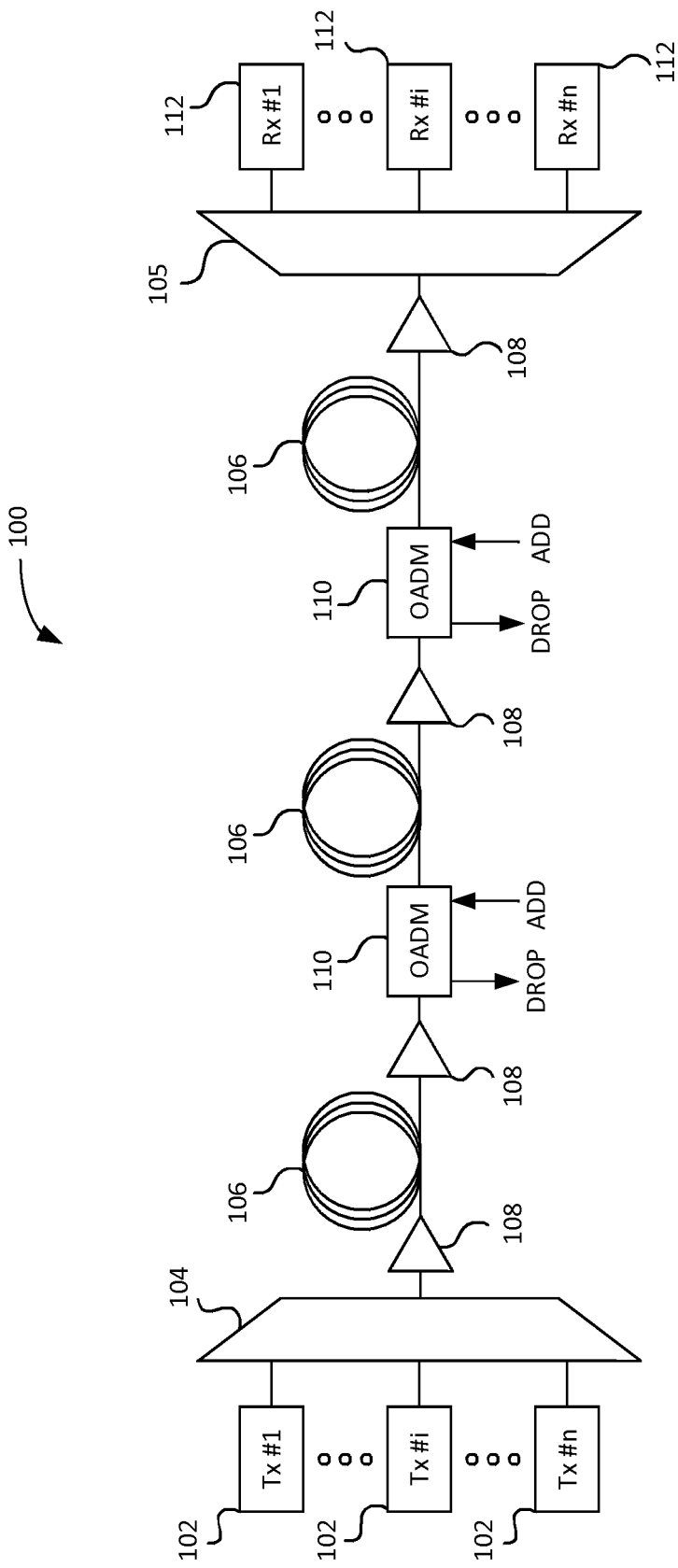
FIG. 1 illustrates a block diagram of selected elements of a physical optical network.

VON provisioning may be subject to unique constraints arising from the underlying physical optical network infrastructure. One constraint may include a slot constraint, where a continuous lightpath at a given wavelength, referred to as a 'spectral slot,' or just 'slot,' is desired by a network customer issuing a VON request. Because the number of slots within a physical optical network may be limited, optimal VON provisioning may involve consideration of slot availability between physical nodes when performing a VON request mapping. Another constraint may include distance adaptive modulation, where longer lightpaths may require more slots than shorter lightpaths. Because a length of a lightpath may impact the cost of a mapping, distance adaptive modulation may be a determining factor between different mapping patterns for VON requests. Additional constraints may arise from physical layer impairments. For example, in some instances, adjacent slots may not be used for certain lightpaths.

VON provisioning may also be associated with general provisioning constraints. For example, a VON request may be limited to assignment of a virtual node to at most one candidate physical node specified in a VON request. Each virtual link between two virtual nodes in a VON request may also be subject to a virtual link capacity constraint that is based on the underlying physical infrastructure of a physical network.

For many physical networks, multiple VON requests may be serviced at any given time. Some physical networks may include a large number of physical nodes, physical links, and slots, such that determining an optimal VON mapping to the physical network may involve significant computational resources and increased computation times. This computational complexity tends to increase with multiple VON requests for a given physical network.

Heuristic mapping processes may process each VON request separately to assign a heuristic best-fit mapping pattern to a VON request. Heuristic mapping processes may be computationally efficient, but they may not provide an optimal VON mapping because all VON requests may not be considered together to find a best-fit mapping pattern and certain permutations of multiple VON requests may go unexplored resulting in reduced VON provisioning. As a result, an overall capacity utilization of a physical network may not be optimal.

Exhaustive enumeration mapping processes considering all possible mapping patterns may be performed for VON requests to theoretically find an optimal mapping solution. However, computational resources and time for exhaustive enumeration may be prohibitively expensive and inflexible to effectively respond to VON requests in a practical manner in some scenarios.

The methods and systems described herein for VON provisioning may provide optimal mapping solutions in a cost effective manner. For example, in at least one embodiment, all possible mapping patterns for each VON request may be considered simultaneously by solving multiple constraint equations with a satisfiability modulo theory (SMT) solver to obtain one or more mapping solutions. The mapping solutions may be further evaluated with additional constraint equations to find a mapping solution with an optimal slot assignment solution. In another embodiment, the mapping solutions may be evaluated using a branch and bound search process to search a solution space to find a mapping solution with an optimal slot assignment solution.

In the following description, details are set forth by way of example to facilitate discussion of the disclosed subject matter. It will be apparent to a person of ordinary skill in the field, however, that the disclosed embodiments are exemplary and not exhaustive of all possible embodiments. Embodiments of the present invention will be explained with reference to the accompanying drawings.

FIG. 1 illustrates an example network 100, which may represent an optical communication system. The network 100 may include one or more optical fibers 106 configured to transport one or more optical signals communicated by components, such as network elements, of the network 100. The network elements of the network 100 may be coupled together by the optical fibers 106 and may include one or more transmitters 102, one or more multiplexers 104, one or more optical amplifiers 108, one or more optical add/drop multiplexers (OADM) 110, one or more demultiplexers 105, and one or more receivers 112, among potentially other network elements (not shown).

The network 100 may include a point-to-point optical network with terminal nodes, a ring optical network, a mesh optical network, or any other suitable optical network or combination of optical networks. The optical fibers 106 may include thin strands of glass capable of communicating light signals over long distances with very low loss. The optical fibers 106 may include any suitable type of fiber selected from a variety of different fiber types.

Information may be transmitted and received through the network 100 by modulating one or more wavelengths of light and encoding information on the one or more wavelengths of light. In optical networking, a wavelength of light may also be referred to as a channel, a spectral slot, or a slot. Each slot may be configured to carry a certain amount of information through the optical network 100.

In some embodiments, multiple light signals may be simultaneously transmitted through a single fiber utilizing multiple wavelengths (each wavelength representing a slot) by combining the slots into a single wideband optical signal using wavelength division multiplexing (WDM). Coarse wavelength division multiplexing (CWDM) refers to the multiplexing of wavelengths that are widely spaced on a low number of slots, typically greater than 20 nm and less than sixteen wavelengths. Dense wavelength division multiplexing (DWDM) refers to the multiplexing of wavelengths that are closely spaced with a large number of slots, typically less than 0.8 nm spacing and greater than forty wavelengths. WDM or other multi-wavelength multiplexing transmission techniques are employed in optical networks to increase the aggregate bandwidth per optical fiber. Without WDM, the bandwidth in optical networks may be limited to the bit-rate of one wavelength. The network 100 may be configured to transmit disparate channels using WDM or some other suitable multi-channel multiplexing technique.

The transmitters (Tx) 102 may be configured to transmit optical signals through the network 100 in specific wavelengths. Each of the transmitters 102 may include a system, apparatus, or device configured to convert electrical signals into optical signals for transmission. The transmitters 102 may each include a laser and a modulator to receive electrical signals and modulate information contained in the electrical signals onto a beam of light produced by the laser at a particular wavelength and transmit the beam of light through one or more portions of the network 100. The term "light" is used generically herein to refer to electromagnetic radiation of any suitable wavelength, and may include light with wavelengths of, e.g., about 800-900 nanometers (nm), 1360-1460 nm, 1530-1565 nm, or other suitable wavelengths.

The multiplexer 104 may be optically coupled to the transmitters 102 and may include a system, apparatus, or device configured to combine the light beams transmitted by transmitters 102 at different wavelengths into a WDM signal comprising multiple channels, or slots propagating on a common optical path (e.g., within optical fiber 106).

The optical amplifiers 108 may amplify the WDM signal within the network 100 and may be positioned before and/or after certain lengths of the fiber 106. The optical amplifiers 108 may include a system, apparatus, or device configured to amplify WDM signals. In at least one embodiment, the optical amplifiers 108 may include optical repeaters that amplify the WDM signal. This amplification may be performed with opto-electrical or electro-optical conversion. In some embodiments, the optical amplifiers 108 may include optical fibers doped with a rare-earth element to form doped fiber amplification elements such that, when a signal passes through the fibers, external energy may be applied in the form of a pump signal to excite atoms of the doped portion of the optical fibers to increase the intensity of the WDM signal. In one embodiment, the optical amplifiers 108 include erbium-doped fiber amplifiers (EDFA).

The OADMs 110 may be coupled to the network 100 via the fibers 106. The OADMs 110 may include add/drop modules, which may include a system, apparatus, or device configured to add and/or drop optical signals at individual wavelengths from the fibers 106. Optical signals may travel along the fibers 106 directly to a destination, or optical signals may be passed through one or more additional OADMs 110 and/or optical amplifiers 108 before reaching a destination.

The network 100 may also include one or more demultiplexers 105 at one or more destinations of the network 100. The demultiplexer 105 may include a system, apparatus, or device that acts as a demultiplexer by splitting a single composite WDM signal into individual channels at respective wavelengths on different optical paths. In one non-limiting example, the network 100 may transmit and carry a forty channel DWDM signal. The demultiplexer 105 may divide the forty channel DWDM signal into forty separate optical signals according to the forty different channels and may direct each of the separate optical signals to a corresponding one of the receivers 112.

In certain embodiments of the network 100, the OADMs 110 may represent reconfigurable OADMs (ROADMs) that are capable of adding or dropping individual or multiple wavelengths of a WDM signal. The individual or multiple wavelengths may be added or dropped in the optical domain, for example, using a wavelength selective switch (WSS) (not shown) which may be included in a ROADM.

The receivers 112 may be optically coupled to the demultiplexer 105. Each receiver 112 may be configured to receive a corresponding one of the separate optical signals from the demultiplexer 105 and may process the optical signals to obtain data carried by the optical signals. For example, each receiver 112 may generate an electrical data signal representative of a corresponding optical signal incident thereon. Accordingly, the network 100 may include at least one receiver 112 for each channel, or slot, of the network 100.

Optical networks may employ modulation techniques to convey information contained within optical signals. Example modulation schemes may include, but are not limited to: phase-shift keying (PSK), frequency-shift keying (FSK), amplitude-shift keying (ASK), and quadrature amplitude modulation (QAM), among others. In PSK, information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, information carried by the optical signal may be conveyed by modulating both the amplitude and phase of the carrier wave. PSK may be considered a subset of QAM, where the amplitude of the carrier waves is maintained constant. Additionally, polarization division multiplexing (PDM) technology may enable a greater bit rate for transmitting information. PDM transmission includes modulating information onto various polarization components of an optical signal associated with a channel. The polarization of an optical signal may generally refer to the direction of oscillations of the optical signal. The term "polarization" may generally refer to the path traced out by the tip of the electric field vector of the optical signal at a point in space, which may be perpendicular to the propagation direction of the optical signal.

Optical networks may have a physical layer including a management plane, a control plane, and a transport plane (not shown). A central management host (not shown) may reside in the management plane and may be configured to supervise the components of the control plane. The management plane may have ultimate control over transport plane entities, control plane entities, and network elements. As one non-limiting example, the management plane may consist of a central processing center (e.g., a central management host), including one or more processing resources and data storage components. The management plane may be in electrical communication with the elements of the control plane and may also be in electrical communication with one or more network elements of the transport plane. The management plane may perform management functions for an overall system and provide coordination between network elements, the control plane, and the transport plane. In some examples, the management plane may include an element management system (EMS) that handles one or more network elements from the perspective of the network elements, a network management system (NMS) which handles devices from the perspective of the network, and/or an operational support system (OSS) which handles network-wide operations.

Modifications, additions or omissions may be made to the network 100 without departing from the scope of the disclosure. For example, the network 100 may include more or fewer elements than those depicted in FIG. 1. Additionally, the network 100 may include other elements not expressly shown, such as a dispersion compensation module (DCM). The network 100 may include any suitable network topology for transmitting optical signals such as a ring, a mesh, and/or a hierarchical network topology.

Figure 2A:
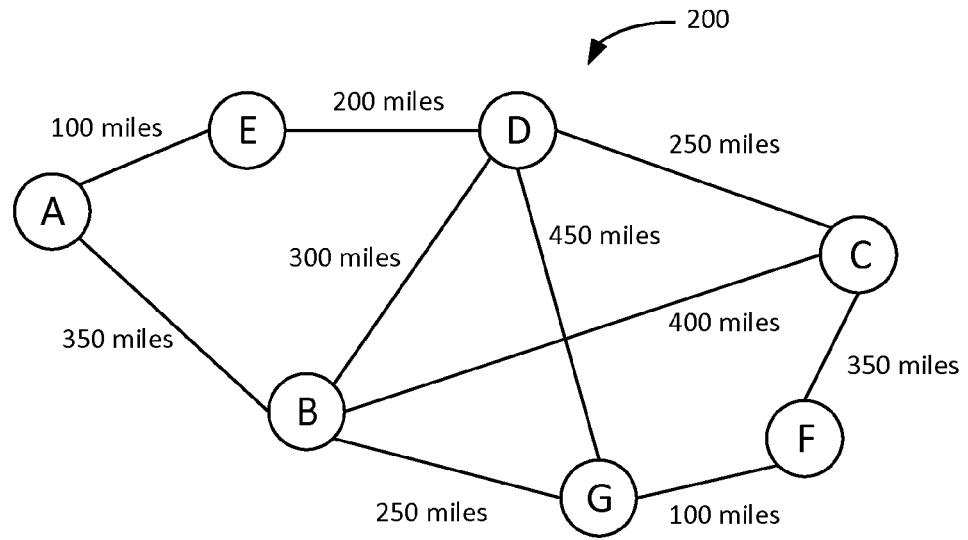
FIG. 2A is an example network map illustrating physical nodes connected by physical links.

FIG. 2A illustrates an example physical network 200 including physical nodes connected to each other by physical links. The physical network 200 may include or correspond to the network 100 of FIG. 1. The physical network 200 includes physical nodes A, B, C, D, E, F and G with physical links shown with physical lengths, or link span distances, measured in miles. Each physical link may have a physical length and one or more optical transmission slots. It is noted that the physical network 200 may not be drawn to scale, but may illustrate approximate relative locations of physical nodes in relation to each other.

The physical network 200 may include certain physical constraints, including but not limited to: mapping constraints, such as (1) each virtual node is mapped to one of its candidate physical nodes, (2) each virtual link is mapped to one or more physical links, and (3) two virtual nodes in a VON request cannot be mapped to the same physical node; (4) a link capacity constraint due to a fixed number of slots per physical link; (5) a distance adaptive modulation constraint which may require longer virtual links to use more slots than shorter virtual links due to signal attenuation over longer lightpaths; (6) a slot continuity constraint which requires each virtual link to occupy the same slot position over each physical link traversed by the virtual link; (7) a slot fragmentation constraint requiring each virtual link to be assigned to a lowest available slot to enable future VON requests to be added to the physical network 200; (8) an adjacent slot constraint which may disallow certain slots to be adjacent to each other due to interference concerns; and (9) a data capacity constraint which may define a maximum data capacity for a physical link or group of physical links connected with each other (e.g., 400 gigabits per second), among other physical constraints.

It may be desirable to find an optimal mapping solution for one or more VON requests to be serviced by a physical network in view of the specific physical constraints imposed by the physical network. For example, an optimal mapping solution may allow all (or the greatest number of) VON requests to be serviced by a physical network while respecting all of the unique physical constraints of the network and yielding a lowest cost in terms of the number of slots used by the mapping solution and a lowest cost in terms of slot fragmentation of the mapping solution.

Figure 2B:
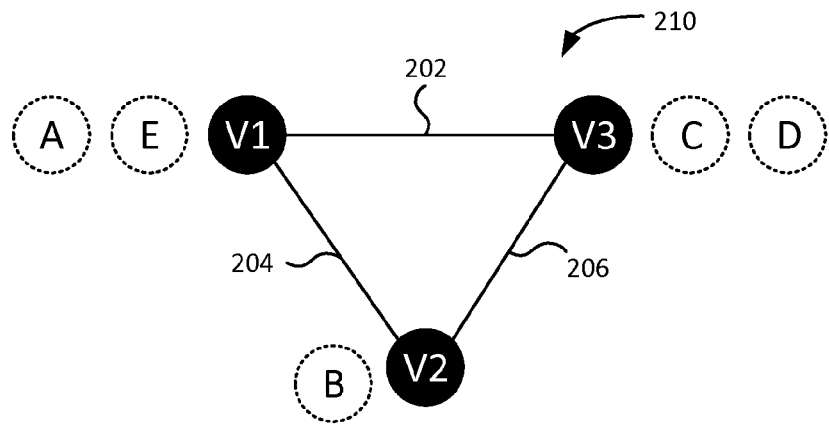
FIGS. 2B and 2C illustrate two example VON requests.
Figure 2C:
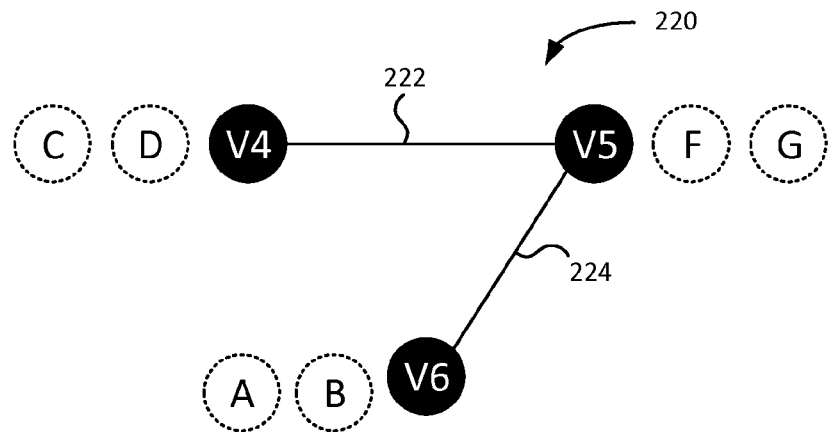

FIGS. 2B and 2C illustrate two example VON requests, VON1 request 210 and VON2 request 220, which will be mapped to the physical network 200 in order to illustrate one example of a VON request provisioning. In order to simplify this example, it will be assumed that each physical link in the physical network 200 has two slots, virtual links traversing distances less than or equal to 400 miles require one slot, and virtual links traversing distances greater than 400 miles require two slots. However, it is understood that other numbers of slots per physical link and other distance adaptive modulation constraints may be used in other network provisioning examples.

In FIG. 2B, the VON1 request 210 specifies three virtual nodes, V1, V2, and V3, as well as three virtual links connecting the virtual nodes. Specifically, a virtual link 202 connects virtual nodes V1 and V3, a virtual link 204 connects virtual nodes V1 and V2, and a virtual link 206 connects virtual nodes V2 and V3.

FIG. 2B shows virtual nodes V1, V2, and V3 of the VON1 request 210 which may be mapped to physical candidate nodes A, B, C, D, and E in the physical network 200. The candidate nodes for each virtual node are shown with dashed lines adjacent to their virtual node. Specifically, candidate nodes A and E correspond to virtual node V1, candidate node B corresponds to virtual node V2, and candidate nodes C and D correspond to virtual node V3. Each virtual node may be mapped to one of its candidate nodes to form a unique mapping pattern and two virtual nodes in a VON request may not be mapped to the same candidate node. Accordingly, there are four possible mapping patterns for the VON1 request 210, which are listed in Table 1 below.

TABLE 1

Possible mapping patterns for VON1.

| Mapping Patterns (VON1) | V1 | V2 | V3 |
|---|---|---|---|
| MP01 | A | B | C |
| MP02 | A | B | D |
| MP03 | E | B | C |
| MP04 | E | B | D |

In FIG. 2C, the VON2 request 220 specifies three virtual nodes, V4, V5, and V6, as well as two virtual links connecting the virtual nodes. Specifically, a virtual link 222 connects virtual nodes V4 and V5 and a virtual link 224 connects virtual nodes V5 and V6.

The virtual nodes V4, V5, and V6 of VON2 request 220 may be mapped to candidate nodes A, B, C, D, F and G in the network map 200. The candidate nodes for each virtual node are shown with dashed lines adjacent to the virtual node that they correspond to. Specifically, candidate nodes C and D correspond to virtual node V4, candidate nodes F and G correspond to virtual node V5, and candidate nodes A and B correspond to virtual node V6. Each virtual node may be "mapped" to one of its candidate nodes to form a unique mapping pattern. Accordingly, there are eight possible mapping patterns for the VON2 request 220, which are listed in Table 2 below.

TABLE 2

Possible mapping patterns for VON2.

| Mapping Patterns (VON2) | V4 | V5 | V6 |
|---|---|---|---|
| MP05 | C | F | A |
| MP06 | C | F | B |
| MP07 | C | G | A |
| MP08 | C | G | B |
| MP09 | D | F | A |
| MP10 | D | F | B |
| MP11 | D | G | A |
| MP12 | D | G | B |

As discussed previously, it may be desirable to find an optimal mapping solution for both VON1 210 and VON2 220 for mapping to the physical network 200. However, combining the four mapping patterns of VON1 210 with the eight mapping patterns of VON2 220 yields thirty two combined mapping patterns (4×8=32), increasing computational complexity.

One way to reduce computational complexity may be to divide the optimal mapping solution problem into two steps. The first step may deal with finding possible mapping solutions that respect mapping pattern constraints, link capacity constraints, and distance adaptive modulation constraints. The second step may further analyze possible mapping solutions that passed the first step with respect to slot continuity and slot fragmentation constraints to determine a final optimal mapping solution. For example, some of the mapping patterns of the thirty two possible mapping patterns may fail the first step because they violate link capacity constraints, resulting in physical link oversubscription issues. Computational efficiency may be increased because these mapping patterns may be identified and excluded in the first step such that further computation resources are not wasted on these mapping patterns in the second step.

Figure 3A:
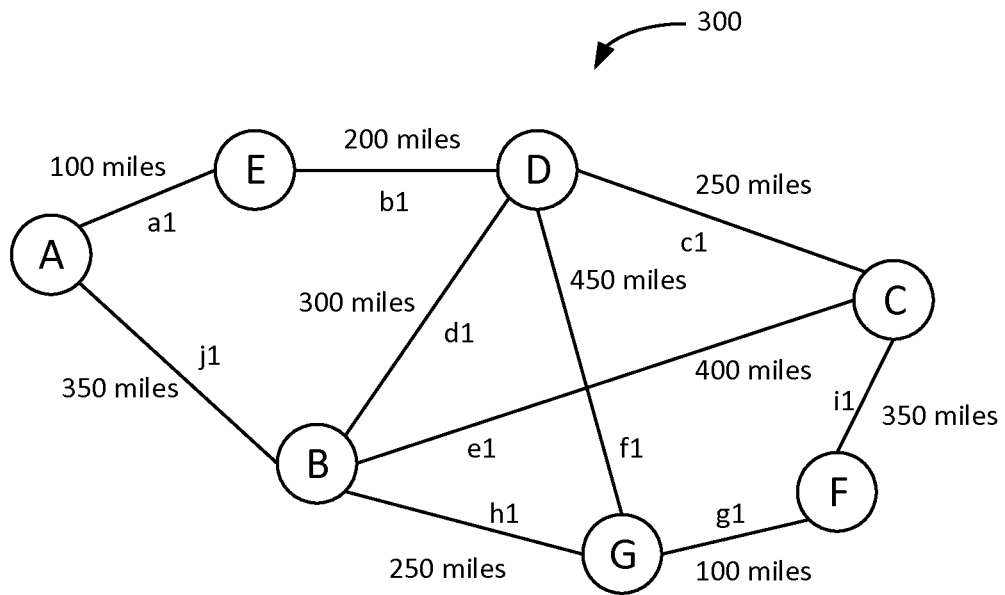
FIGS. 3A and 3B illustrate the example network map of FIG. 2A with each physical link labeled with variables corresponding to the two example VON requests of FIGS. 2B and 2C.
Figure 3B:
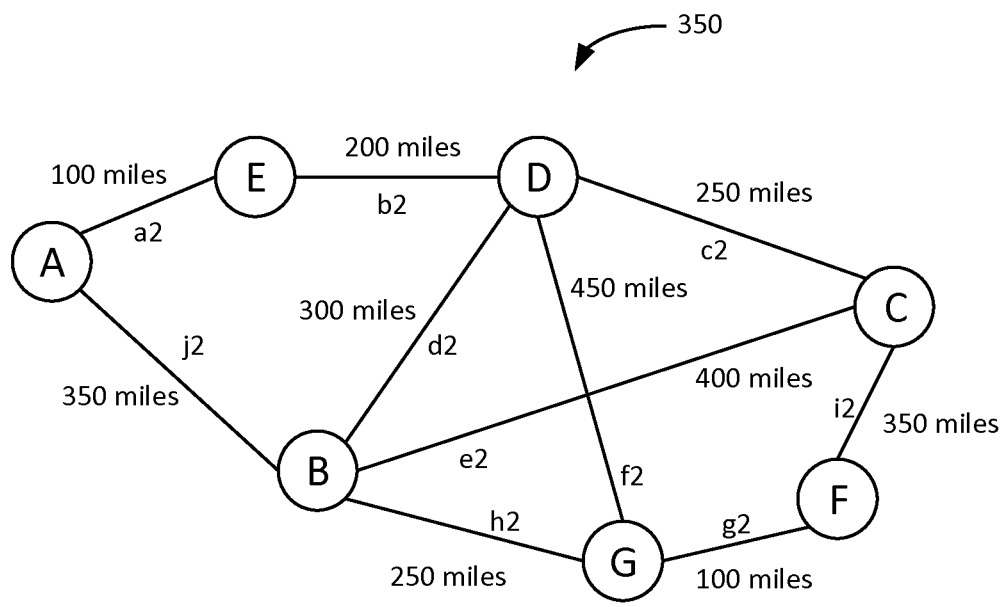

SMT solvers (not shown) may be capable of solving many constraint equations simultaneously to find one or more solutions that satisfy a given set of constraint equations. The mapping patterns for VON1 request 210 and VON2 request 220 may be used to derive a set of constraint equations for input to an SMT solver. FIG. 3A shows a physical network 300, which corresponds to the physical network 200 of FIG. 2A and includes variables for each physical link corresponding to VON1 request 210, namely: a1, b1, c1, d1, e1, f1, g1, h1, i1, and j1. FIG. 3A shows a physical network 350, which corresponds to the physical network 200 of FIG. 2A and includes variables for each physical link corresponding to VON2 request 220, namely: a2, b2, c2, d2, e2, f2, g2, h2, i2, and j2.

Each mapping pattern in Table 1 may be mapped onto physical network 300 to derive mapping pattern constraint equations for VON1 request 210 and each mapping pattern in Table 2 may be mapped onto physical network 350 to derive mapping pattern constraint equations for VON2 request 220. For example, MP01 (A-B-C) from Table 1 mapped onto the physical network 300 may result in the following Boolean constraint equation for MP01: ((a1==2) && (b1==2) && (c1==2) && (j1==1) && (e1==1)), where the virtual link from A to C crosses a1, b1, and c1 with a total virtual link length of 100+200+250=550 miles. Thus, the virtual link from A to C is assigned to two slots over a1, b1, and c1 given the distance adaptive modulation constraint requiring two slots for virtual links exceeding 400 miles in physical length. This does not violate the link capacity constraints for these physical links because it was previously assumed that each physical link has two slots in this example. The virtual link from C to B crosses e1 and requires only 1 slot because its length is less than 400 miles and the virtual link from B to A crosses j1 and likewise requires only 1 slot. In similar fashion, each mapping pattern for the VON1 request 210 in Table 1 may be mapped to the physical network 300 of FIG. 3A and corresponding mapping pattern constraint equations may be derived. Once all four mapping patterns for VON1 request 210 have been derived, these four mapping pattern constraint equations may be conjuncted together to describe all mapping patterns for VON1 request 210 as follows: {((a1==2) && (b1==2) && (c1==2) && (j1==1) && (e1==1)) OR ((a1==1) && (b1==1) && (j1==1) && (d1==1)) OR ((b1==1) && (c1==1) && (a1==2) && (j1==2) && (e1==1)) OR ((b1==1) && (a1==2) && (j1==2) && (d1==1))}. This process may also be performed for each of the eight mapping patterns for VON2 request 220 of Table 1 and the resulting set of mapping pattern constraint equations may be conjuncted with the above set of mapping pattern constraint equations to form a first set of constraint equations.

In one embodiment, additional Boolean clauses may be added to each mapping pattern based on a union of Boolean clauses that are assigned an integer number for each VON request. For example, a union of the mapping pattern constraint equations for VON1 request 210 may be taken and additional Boolean clauses that are assigned zero slots may be added to each mapping pattern constraint equation as follows: {((a1==2) && (b1==2) && (c1==2) && (j1==1) && (e1==1) && (d1==0)) OR ((a1==1) && (b1==1) && (j1==1) && (d1==1) && (c1==0) && (e1==0)) OR ((b1==1) && (c1==1) && (a1==2) && (j1==2) && (e1==1) && (d1==0)) OR ((b1==1) && (a1==2) && (j1==2) && (d1==1) && (c1==0) && (e1==0))}. Adding these extra Boolean clauses to each mapping pattern constraint equation may enable the SMT solver to find solutions in less time.

A second set of constraint equations may be formulated based on link capacity constraints for the physical network 200. As mentioned previously, in this example it is assumed that each physical link in the physical network 200 has two slots. Accordingly, a second set of constraint equations that describe this link capacity constraint may be as follows: $\{(0<=a1+a2<=2); (0<=b1+b2<=2); (0<=c1+c2<=2); (0<=d1+d2<=2); (0<=e1+e2<=2); (0<=f1+f2<=2); (0<=g1+g2<=2); (0<=h1+h2<=2); (0<=i1+i2<=2); (0<=j1+j2<=2);\}$. This second set of constraint equations constrains each physical link to at most two slots per physical link, consistent with our assumption for this example.

The first and second sets of constraint equations may be solved by an SMT solver according to one or more SMT theories to obtain one or more mapping solutions that do not violate link capacity or distance adaptive modulation constraints. If no valid mapping solutions exist, the SMT solver may return an infeasible problem determination indicating that no feasible mapping solution was found.

In at least one embodiment, a best mapping solution may be determined by searching for a mapping solution that does not violate the link capacity constraint and has a least amount of slots used by the mapping solution. This process may be accomplished using a binary search process that applies a third constraint equation to iteratively find a tighter mapping solution, if one exists. For example, if an initial mapping solution is found, a number of slots used by the initial mapping solution may be compared to a theoretical minimum number of slots to form a third constraint equation that may be used to determine whether a tighter mapping solution that uses less slots exists. The theoretical minimum number of slots may be calculated by selecting a mapping pattern for each VON request that, on its face, requires a least number of slots and summing the slots of each of these mapping patterns to determine the theoretical minimum number of slots. If the number of slots used by the initial mapping solution exceeds the theoretical minimum number of slots, the third constraint equation may be created. For example, assume the SMT solver returns the following mapping solution: $\{a1=1; a2=0; b1=1; b2=0, c1=1; c2=0; d1=1; d2=1; e1=0; e2=1; f1=1; f2=1\}$ that uses eight slots, and assume that the theoretical minimum number of slots that may be used is two, then the third constraint equation may be formed as follows: $(a1+b1+c1+d1+c1+e1+f1+a2+b2+c2+d2+c2+e2+f2)<=5$, which may be used with the first and second set of constraint equations to determine if a mapping solution exists that utilizes five or fewer slots. The number of slots to use as a constraint (five in this example) may be a bound determined by the equation: $M_S-\frac{1}{2}*(M_S-T_S)$, where $M_S$ is the number of slots used by a mapping solution and $T_S$ is the theoretical minimum number of slots. In this example, the mapping solution used eight slots, $M_S=8$, and it was assumed that the theoretical minimum number of slots that may be used was two, $T_S=2$. Thus, $M_S-\frac{1}{2}*(M_S-T_S)=8-\frac{1}{2}*(8-2)=5$. This process may be iterated to find one or more tighter mapping solutions and a best mapping solution may be determined based on the one or more tighter mapping solutions.

Alternatively, or in addition thereto, a best relaxed mapping solution may be determined by searching for a mapping solution that does not violate the link capacity constraint and has a least amount of slots used by the mapping solution by iteratively relaxing the number of slots that may be used by a mapping solution to find a relaxed mapping solution. This process may be accomplished using a binary search process that applies a relaxed third constraint equation to iteratively find a relaxed mapping solution, if one exists. For example, if the bound above (5 in this example) is too tight, it may result in a constraint that is infeasible. If this is case, the bound may be progressively relaxed in a binary search process until a new relaxed solution is found, or until the bound relaxes back to a previous solution that was obtained earlier. For example, assume after one iteration the SMT solver returns the following mapping solution: $\{a1=1; a2=0; b1=0; b2=0, c1=1; c2=0; d1=1; d2=0; e1=0; e2=0; f1=1; f2=1\}$, which uses five slots. This may be the best mapping solution obtained thus far. Also assume that further tightening the bound constraint to three results in an infeasible mapping solution. Accordingly, the bound may be relaxed from three to four, such that the third constraint equation has a relaxed bound as follows: $(a1+b1+c1+d1+c1+e1+f1+a2+b2+c2+d2+c2+e2+f2)<=4$. This third constraint equation with a relaxed bound may be used with the first and second set of constraint equations to determine if a relaxed mapping solution exists that utilizes four or fewer slots. The relaxed bound in this example may be determined by the equation: $M_z+\frac{1}{2}*(M_k-M_z)$, where $M_z$ is the bound of the third constraint equation for the tighter mapping solution that is not feasible and $M_k$ is the number of slots used in a best mapping solution obtained thus far, ($M_z=3$ and $M_k=5$, respectively in this example). Thus, the relaxed bound may be calculated as $M_z+\frac{1}{2}*(M_k-M_z)=3+\frac{1}{2}*(5-3)=4$. This process may be iterated to find one or more relaxed mapping solutions and a best relaxed mapping solution may be determined based on the one or more relaxed mapping solutions. This process may terminate when the relaxation steps reach a best solution that was previously obtained.

Figure 4:
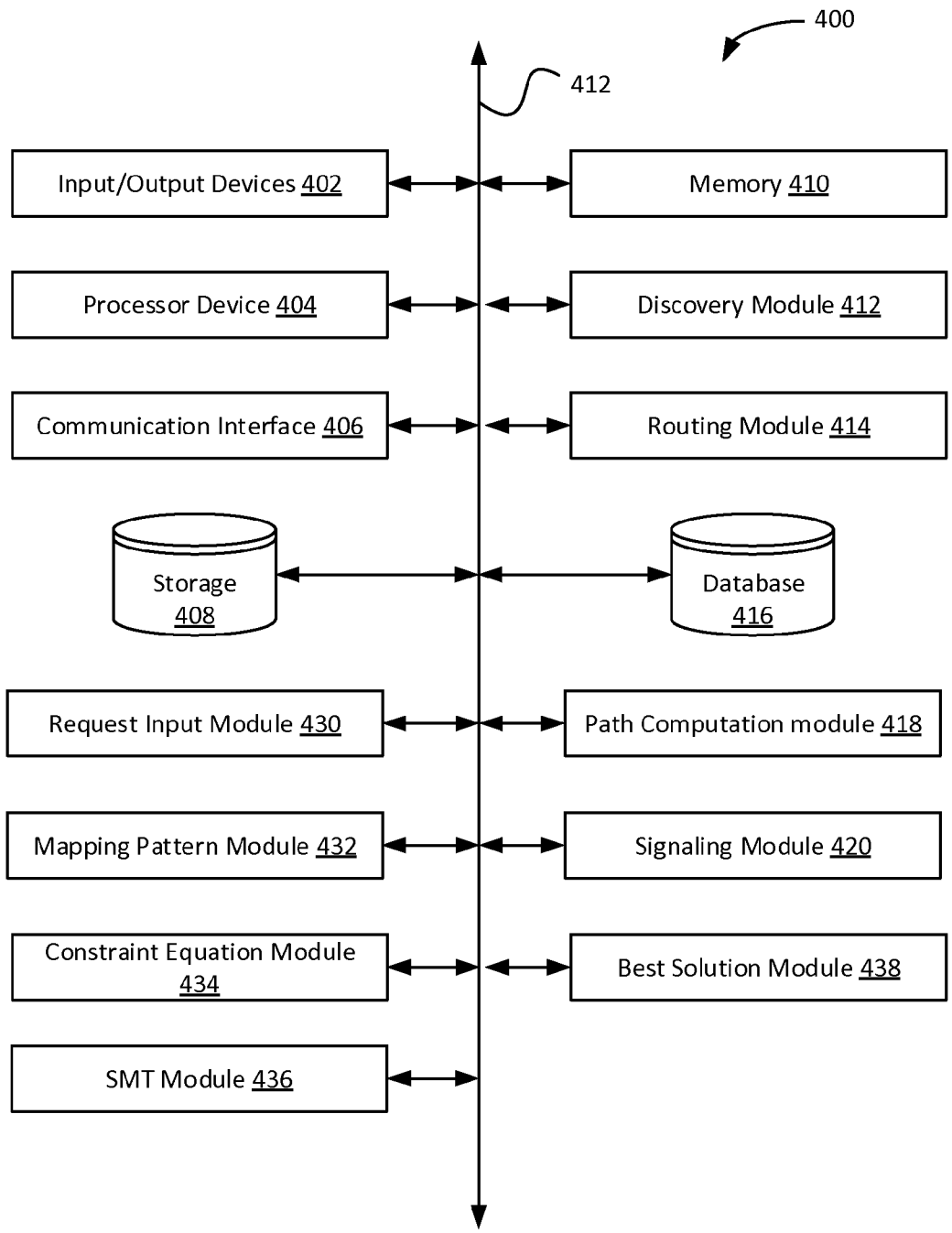
FIG. 4 is a block diagram illustrating an example system to identify mapping solutions for one or more VON requests.

FIG. 4 is a block diagram illustrating an example system 400 to identify potential mapping solutions for one or more VON requests, arranged in accordance with at least some embodiments described herein. The system 400 may be implemented as a computing device having any suitable form factor, such as a server computer, a desktop computer, a laptop, a tablet device, or other suitable computing device. The system 400 may include one or more input/output devices 402, a processor device 404, a communication interface 406, a storage 408, a memory 410, a database 416, a discovery module 412, a routing module 414, a path computation module 418, a signaling module 420, a request input module 430, a mapping pattern module 432, a constraint equation module 434, an SMT module 436, and a best solution module 438 (collectively referred to herein as "modules"), according to some examples. The components of the system 400 may be communicatively coupled by a bus 412. The bus 412 may include one or more of: a memory bus, a storage interface bus, a bus/interface controller, an interface bus, or other suitable bus.

The processor device 404 may include an arithmetic logic unit, a microprocessor, a general-purpose controller, or some other processor or processor array to perform or control performance of operations as described herein. The processor device 404 may process data signals and may include various computing architectures including a complex instruction set computer (CISC) architecture, a reduced instruction set computer (RISC) architecture, or an architecture implementing a combination of instruction sets. Although FIG. 4 includes a single processor device 404, multiple processor devices may be included. Other processors, operating systems, and physical configurations may be possible.

The communication interface 406 may be configured to receive and/or transmit data to and from other computing devices (not shown), such as VON request data. In some implementations, the communication interface 406 includes a port for direct physical connection to a communication channel (not shown) associated with other computing devices. For example, the communication interface 406 may include a universal serial bus (USB) port, a secure digital (SD) port, a category 5 cable (CAT-5) port, or similar port for wired communication with other computing devices. The communication interface 406 may also provide other connections to a network (not shown) for data communication using standard network protocols including transmission control protocol/internet protocol (TCP/IP), HTTP, HTTP secure (HTTPS), and simple mail transfer protocol (SMTP), etc. In some implementations, the communication interface 406 may include a wireless transceiver (not shown) for exchanging data with other computing devices. In these and other embodiments, the transceiver may use one or more wireless communication methods, including IEEE 802.11, IEEE 802.16, Bluetooth®, Bluetooth Low Energy®, Bluetooth SMART®, Wi-Fi, cellular, Near Field communications, ZigBee, or any other suitable wireless communication method to communicate with other computing devices.

The storage 408 may include a non-transitory storage medium that stores instructions and/or data for providing the functionality described herein. The storage 408 may include a dynamic random access memory (DRAM) device, a static random access memory (SRAM) device, flash memory, or some other memory devices. In some implementations, the storage 408 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The storage 408 may also store instructions and/or data that are temporarily stored or loaded into the memory 410.

The memory 410 may store instructions or data that may be executed or operated on by the processor device 404. The instructions or data may include programming code that may be executed by the processor device 404 to perform or control performance of the operations described herein. The memory 410 may include a dynamic random access memory (DRAM) device, a static random access memory (SRAM) device, flash memory, or some other memory device. In some implementations, the memory 410 may include a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The memory 410 and/or storage 408 may store data including, but not limited to, data related to one or more VON requests.

The modules 412, 414, 418, 420, 430, 432, 434, 436, 438, may generally include software that includes programming code and/or computer-readable instructions executable by the processor device 404 to perform or control performance of the functions and operations described herein. The modules 412, 414, 418, 420, 430, 432, 434, 436, 438, may receive data from each other or from another one of the components of the system 400 and may store data in one or both of the storage 408 and the memory 410.

Modules 412, 414, 418, 420 may together form a control system for implementing control plane functionality in optical networks. A control plane may include functionality for network intelligence and control and may include applications that support the ability to establish network services, including applications or modules for discovery, routing, path computation, and signaling, as will be described in further detail. The control plane applications executed by the control system may work together to automatically establish services within an optical network. The discovery module 412 may discover local links connecting to neighbors. The routing module 414 may broadcast local link information to optical network nodes while populating the database 416. When a request for service from the optical network is received, the path computation module 418 may be called to compute a network path using the database 416. This network path may then be provided to the signaling module 420 to establish the requested service.

In certain embodiments, the system 400 may be configured to interface with a user (not shown) and receive data about an optical signal transmission path. For example, the system 400 may include and/or may be coupled to one or more input/output devices 402 to facilitate receiving data about an optical signal transmission path from the user and/or outputting results to the user. The one or more input/output devices (not shown) may include, but are not limited to, a keyboard, a mouse, a touchpad, a microphone, a display, a touchscreen display, an audio speaker, or the like. Alternately or additionally, the system 400 may be configured to receive data about an optical signal transmission path from a device such as another computing device and/or a network element (not shown).

The discovery module 412 may be configured to receive data concerning an optical signal transmission path in an optical network and may be responsible for discovery of neighbors and links between neighbors. The discovery module 412 may send discovery messages according to a discovery protocol, and may receive data about the optical signal transmission path. In some embodiments, the discovery module 412 may determine network characteristics, such as, but not limited to, fiber type; fiber length; number and/or type of components; data rate; modulation format of the data; input power of the optical signal; number of signal carrying wavelengths (i.e., channels, or slots); channel spacing; traffic demand; and/or network topology, among other network characteristics.

The routing module 414 may be responsible for propagating link connectivity information to various nodes within an optical network. In particular embodiments, the routing module 414 may populate the database 416 with resource information to support traffic engineering, which may include link bandwidth availability. Accordingly, the database 416 may be populated by the routing module 414 with information that may be used to determine a network topology of an optical network.

The path computation module 418 may be configured to use the information provided by the routing module 414 to the database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), amplified spontaneous emission (ASE) and/or others may affect optical signals within the optical signal transmission path. To determine the transmission characteristics of the optical signal transmission path, the path computation module 418 may consider the interplay between transmission degradation factors. In some embodiments, the path computation module 418 may generate values for specific transmission degradation factors. The path computation module 418 may further store data describing the optical signal transmission path in the database 416.

The signaling module 420 may provide functionality associated with setting up, modifying, and tearing down end-to-end network services in an optical network. For example, when an ingress node in the optical network receives a service request, the system 400 may utilize the signaling module 420 to request a network path from the path computation module 418 that may consider different criteria, such as bandwidth and cost. When a desired network path is identified, the signaling module 420 may communicate with respective nodes along the network path to establish the requested network services. In some embodiments, the signaling module 420 may employ a signaling protocol to propagate communications to and from nodes along the network path.

The system 400 may represent and/or include a SDON controller including functionality to select optimal mapping solutions for one or more VON requests, as described herein. The SDON controller may reserve physical network resources according to selected mapping solutions to service the VON request. When no valid mapping solution is available, the SDON controller may deny the VON request and/or search for a valid mapping solution that may service a greatest number of VON requests.

An example implementation of the system 400 will now be discussed with reference to modules 430, 432, 434, 436, and 438. The request input module 430 may be configured to receive one or more VON requests for mapping to a physical network. The one or more VON requests may be received by the mapping pattern module 432 which may be configured to identify all possible mapping patterns for each VON request by iteratively assigning each virtual node of each VON request to one of their candidate nodes for every possible combination candidate nodes.

The mapping patterns may be sent to the constraint equation module 434 which may be configured to utilize each mapping pattern identified by the mapping pattern module 432 to formulate and conjunct a first set of constraint equations based on each mapping pattern for each VON request and/or any distance adaptive modulation constraints, as previously discussed with reference to FIGS. 2A-3B. The constraint equation module 434 may also be configured to add additional Boolean clauses to each mapping pattern in the first set of constraint equations based on a union of Boolean clauses assigned an integer number for each VON request and formulate a second set of constraint equations based on physical network constraints, such as available slots per physical link, to ensure link capacity constraints are maintained.

The first and second set of constraint equations may be sent to the SMT module 436, which may be configured to find one or more mapping solutions that satisfy each constraint equation in the first and second set of constraint equations, or alternatively, if no solution exists, return an indication that no feasible solution exists for the given constraint equations.

The best solution module 438 may be configured to receive a mapping solution, calculate how many slots are used in the mapping solution, and compare this value to a theoretical minimum number of slots. If the number of slots used by the mapping solution is greater than the theoretical minimum number of slots, the best solution module 438 may formulate a third constraint equation to search for one or more tighter mapping solutions having a less number of slots than the mapping solution, as previously discussed, and determine a best mapping solution based on the one or more tighter mapping solutions.

The best solution module 438 may also be configured to receive an indication that a tighter mapping solution is not feasible and relax the bound of the third constraint equation to search for one or more relaxed mapping solutions, as previously discussed, to determine a best relaxed mapping solution based on the one or more relaxed mapping solutions.

Figure 5A:
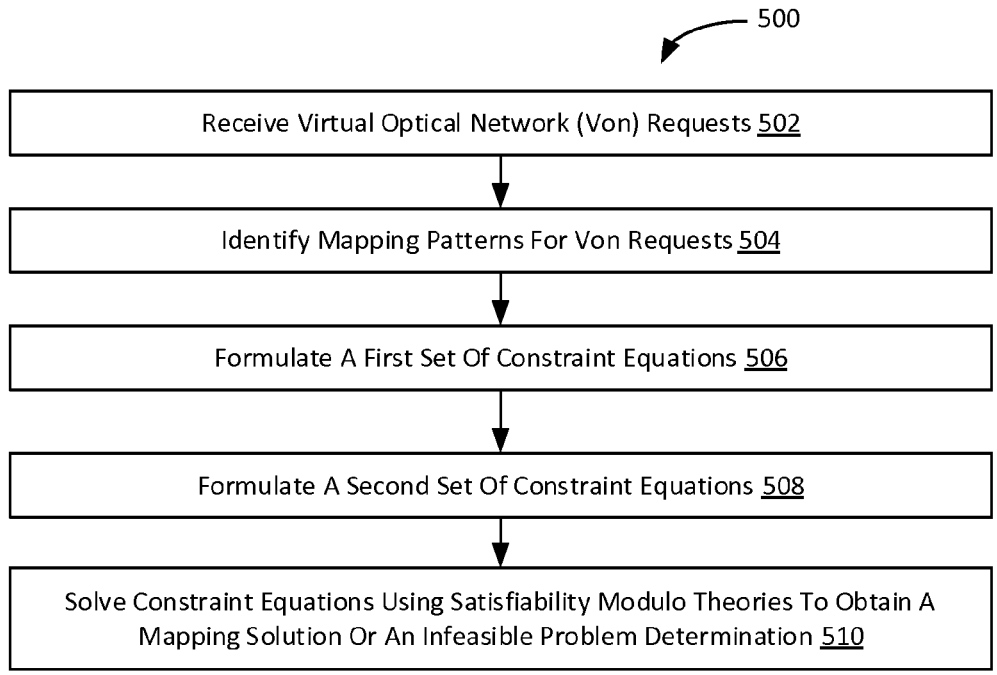
FIG. 5A is an example flow diagram illustrating a method of obtaining mapping solutions for one or more VON requests.

FIG. 5A shows an example flow diagram of a method 500 to obtain mapping solutions for one or more VON requests, arranged in accordance with at least one embodiment described herein. The method 500 may be implemented, in whole or in part, by the system 400 of FIG. 4, or another suitable device or system. The method 500 may begin at block 502.

In block 502 ("Receive Virtual Optical Network (Von) Requests"), one or more virtual optical network (VON) requests may be received. The VON requests may include one or more virtual nodes and one or more virtual links. The virtual nodes may have one or more candidate nodes corresponding to a physical network and the virtual links may correspond to one or more physical links in the physical network. Block 502 may be followed by block 504.

In block 504 ("Identify Mapping Patterns For Von Requests"), all possible mapping patterns may be identified for each VON request by assigning each virtual node to one of their candidate nodes for all possible combinations of candidate nodes. The virtual links for each mapping pattern may be determined by the selected candidate nodes for each mapping pattern and one or more physical links that connect each candidate node in the mapping pattern. Block 504 may be followed by block 506.

In block 506 ("Formulate A First Set Of Constraint Equations"), a first set of constraint equations may be formulated based on mapping patterns for the VON requests. Variables may be assigned to each physical link in the physical network which identify each physical link according to individual VON requests. Each mapping pattern may then be applied to a map of the network and each physical link that is traversed by a mapping pattern may be identified and its corresponding variable may be assigned an integer number denoting the number of slots used by the VON request over each physical link. Boolean clauses may then be formed based on these variables and conjuncted with each other to form the first set of constraint equations. Block 506 may be followed by block 508.

In block 508 ("Formulate A Second Set Of Constraint Equations"), a second set of constraint equations may be formulated based on physical network constraints to require mapping patterns to comply with link capacity constraints of the physical network. The second set of constraint equations may include summations for each of the variables identifying a physical link in the physical network by VON request and then constraining each physical link summation to be less than or equal to a total number of optical transmission slots available on the physical link. Block 508 may be followed by block 510.

In block 510 ("Solve Constraint Equations Using Satisfiability Modulo Theories To Obtain A Mapping Solution Or An Infeasible Problem Determination"), the first and second set of constraint equations may be solved according to one or more satisfiability modulo theories to obtain a mapping solution or an infeasible problem determination.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

Figure 5B:
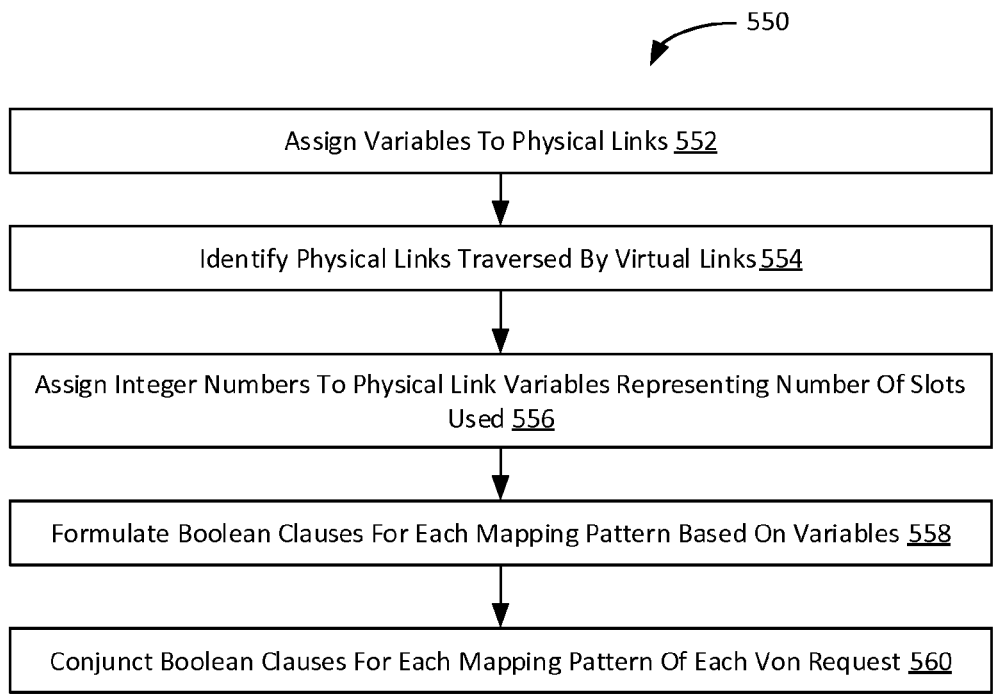
FIG. 5B is an example flow diagram illustrating a method of formulating link capacity constraint equations for different mapping patterns of one or more VON requests.

FIG. 5B shows an example flow diagram of a method 550 of formulating link capacity constraint equations for different mapping patterns of one or more VON requests, arranged in accordance with at least one embodiment described herein. The method 550 may be implemented, in whole or in part, by the system 400 of FIG. 4, or another suitable device or system. The method 550 may begin at block 552.

In block 552 ("Assign Variables To Physical Links"), variables may be assigned to each physical link in the physical network to identify each physical link according to individual VON requests. Block 552 may be followed by block 554.

In block 554 ("Identify Physical Links Traversed By Virtual Links"), each mapping pattern may be applied to a map of the network and each physical link that is traversed by a mapping pattern may be identified. Block 554 may be followed by block 556.

In block 556 ("Assign Integer Numbers To Physical Link Variables Representing Number Of Slots Used"), variables may be assigned an integer number that denotes the number of slots used by a virtual link over each physical link traversed by the virtual link. Block 556 may be followed by block 558.

In block 558 ("Formulate Boolean Clauses For Each Mapping Pattern Based On Variables"), Boolean clauses may be formed based on variables that are assigned integer numbers denoting the number of slots used. Block 558 may be followed by block 560.

In block 560 ("Conjunct Boolean Clauses For Each Mapping Pattern Of Each Von Request"), the Boolean clauses may be conjuncted with each other to form the first set of constraint equations.

Figure 6A:
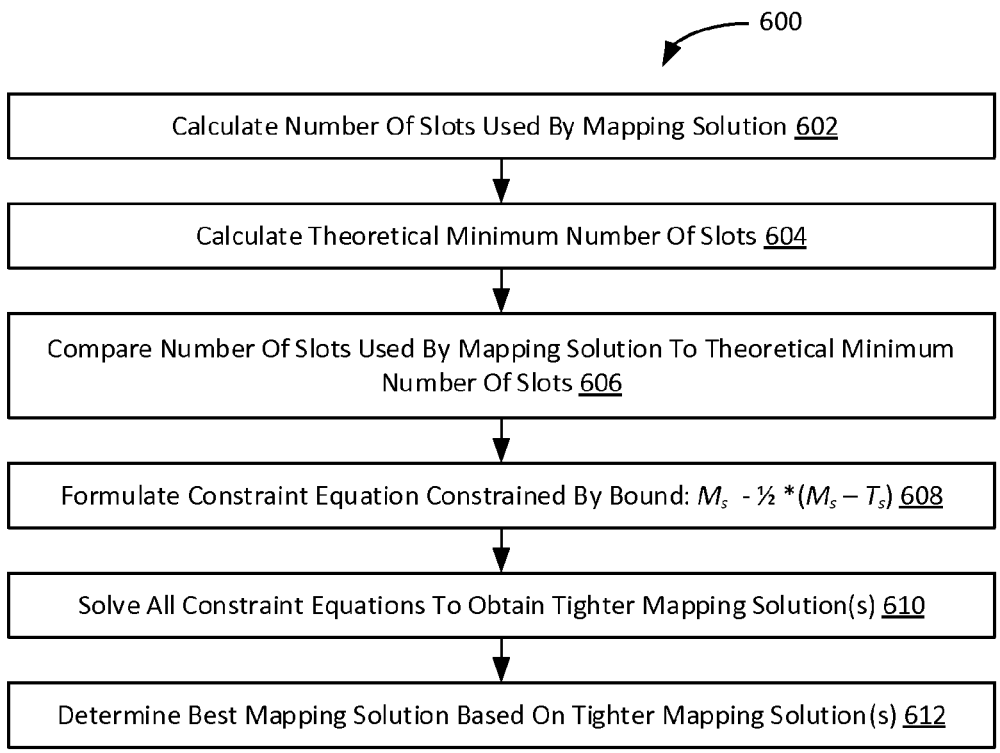
FIG. 6A is an example flow diagram illustrating a method of obtaining a best mapping solution based on one or more tighter mapping solutions.

FIG. 6A shows an example flow diagram of a method 600 of obtaining a best mapping solution based on one or more tighter mapping solutions, arranged in accordance with at least one embodiment described herein. The method 600 may be implemented, in whole or in part, by the system 400 of FIG. 4, or another suitable device or system. The method 600 may begin at block 602.

In block 602 ("Calculate Number Of Slots Used By Mapping Solution"), a number of slots used by a mapping solution may be calculated by summing the slots used by the mapping solution. Block 602 may be followed by block 604.

In block 604 ("Calculate Theoretical Minimum Number Of Slots"), a theoretical minimum number of slots may be calculated by finding a minimum mapping pattern for each VON that uses a least number of slots and summing the slots of each minimum mapping pattern to determine the theoretical minimum number of slots. Block 604 may be followed by block 606.

In block 606 ("Compare Number Of Slots Used By Mapping Solution To Theoretical Minimum Number Of Slots"), the number of slots used by the mapping solution may be compared to the theoretical minimum number of slots. Block 606 may be followed by block 608.

In block 608 ("Formulate Constraint Equation Constrained By Bound: $M_s - \frac{1}{2}*(M_s - T_s)$"), if the number of slots used by the mapping solution exceed the theoretical minimum number of slots, a third constraint equation may be formulated to determine whether a tighter mapping solution exist. The third constraint equation may be created by summing each variable of the mapping solution and constraining the summation to be less than or equal to the number of slots used by the mapping solution decreased by $\frac{1}{2}*(M_S - T_S)$, where $M_S$ is the number of optical transmission slots used by the mapping solution and $T_S$ is the theoretical minimum number of optical transmission slots. Block 608 may be followed by block 610.

In block 610 ("Solve All Constraint Equations To Obtain Tighter Mapping Solution(s)"), the first set of constraint equations, the second set of constraint equations, and the third constraint equation may be solved by one or more satisfiability modulo theories to obtain one or more tighter mapping solutions. Block 610 may be followed by block 612.

In block 612 ("Determine Best Mapping Solution Based On Tighter Mapping Solution(s)"), a best mapping solution may be determined based on the one or more tighter mapping solutions. For example, the best mapping solution may include a tighter mapping solution with the fewest number of slots used.

Figure 6B:
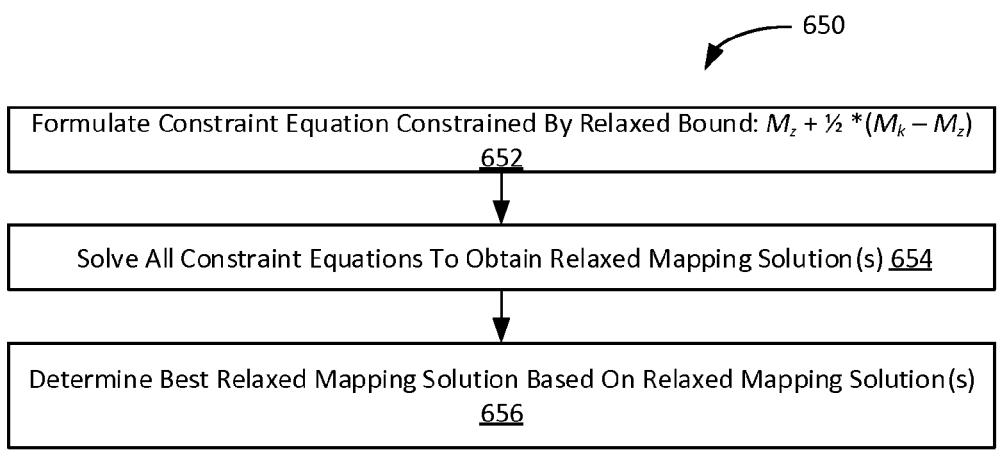
FIG. 6B is an example flow diagram illustrating a method of obtaining a best relaxed mapping solution based on one or more relaxed mapping solutions.

FIG. 6B shows an example flow diagram of a method 650 of obtaining a best relaxed mapping solution based on one or more relaxed mapping solutions, arranged in accordance with at least one embodiment described herein. The method 650 may be implemented, in whole or in part, by the system 400 of FIG. 4, or another suitable device or system. The method 650 may begin at block 652.

In block 652 ("Formulate Constraint Equation(s) Constrained By Relaxed Bound: $M_z + \frac{1}{2}*(M_k - M_z)$"), if a tighter mapping solution is determined to not be feasible, the bound of the third constraint equation may be relaxed by constraining the mapping solution summation to be less than or equal to a relaxed bound defined by $M_z + \frac{1}{2}*(M_k - M_z)$, where $M_z$ is the bound of the third constraint equation for the tighter mapping solution that is not feasible and $M_k$ is the number of slots used in a best mapping solution obtained thus far. Block 652 may be followed by block 654.

In block 654 ("Solve All Constraint Equations To Obtain Relaxed Mapping Solution(s)"), the first set of constraint equations, the second set of constraint equations, and the fourth constraint equation may be solved by one or more satisfiability modulo theories to obtain one or more relaxed mapping solutions. Block 654 may be followed by block 656.

In block 656 ("Determine Best Relaxed Mapping Solution Based On Relaxed Mapping Solution(s)"), a best relaxed mapping solution may be determined based on the one or more relaxed mapping solutions. For example, the best relaxed mapping solution may include a relaxed mapping solution with the fewest number of slots used.

As previously discussed, one way to reduce computational complexity may be to divide the optimal mapping solution problem into two steps. The first step deals with finding possible mapping solutions that respect mapping pattern constraints, link capacity constraints, and distance adaptive modulation constraints. The first step was described above with reference to FIGS. 2A-6B. The second step is described with respect to FIGS. 7A-13B and deals with receiving possible mapping solutions from the first step and further analyzing the possible mapping solutions with respect to slot continuity and slot fragmentation constraints in order to determine a final optimal mapping solution.

Figure 7A:
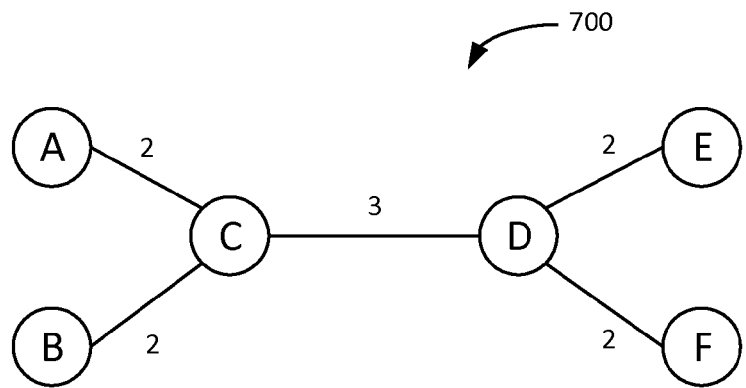
FIG. 7A is an example network map illustrating physical nodes connected by physical links including a number of slots available on each physical link.

FIG. 7A illustrates an example physical network 700 including physical nodes connected to each other by physical links. The physical network 700 includes physical nodes A, B, C, D, E, and F with physical links connecting the physical nodes. The physical links are each labeled with a number of slots that are available over each physical link.

Figure 7B:
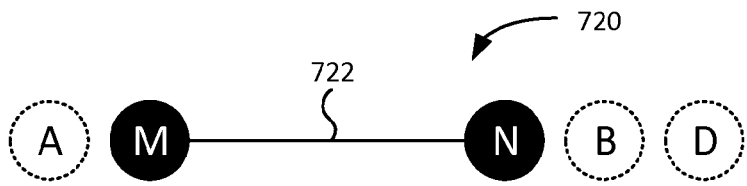
FIGS. 7B-7D illustrate three example VON requests.
Figure 7C:
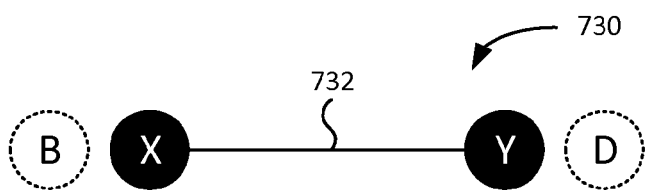
Figure 7D:
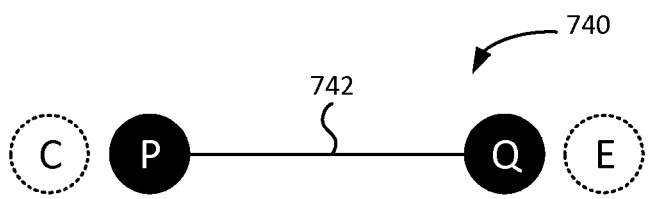

FIGS. 7B-7D illustrate three example VON requests, VON[0] 720, VON[1] 730, and VON[2] 740, which may be mapped to the physical network 700.

In FIG. 7B, VON[0] 720 specifies two virtual nodes, M and N, as well as one virtual link M-N 722 connecting the virtual nodes M and N. The virtual node M may be mapped to one candidate node A and the virtual node N may be mapped to two candidate nodes B and D in the physical network 700. The candidate nodes for each virtual node are shown with dashed lines adjacent to their virtual node. Each virtual node may be mapped to one of its candidate nodes to form a unique mapping pattern. Accordingly, there are two possible mapping patterns for VON[0] 720, (A-C-B) and (A-C-D).

In FIG. 7C, VON[1] 730 specifies two virtual nodes, X and Y, as well as one virtual link X-Y 732 connecting the virtual nodes X and Y. The virtual node X may be mapped to one candidate node B and the virtual node Y may be mapped to one candidate node D in the physical network 700. Accordingly, there is only one possible mapping pattern for VON[1] 730, (B-C-D).

In FIG. 7D, VON[2] 740 specifies two virtual nodes, P and Q, as well as one virtual link P-Q 742 connecting the virtual nodes P and Q. The virtual node P may be mapped to one candidate node C and the virtual node Q may be mapped to one candidate node E in the physical network 700. Accordingly, there is only one possible mapping pattern for VON[2] 740, (C-D-E).

Figure 8A:
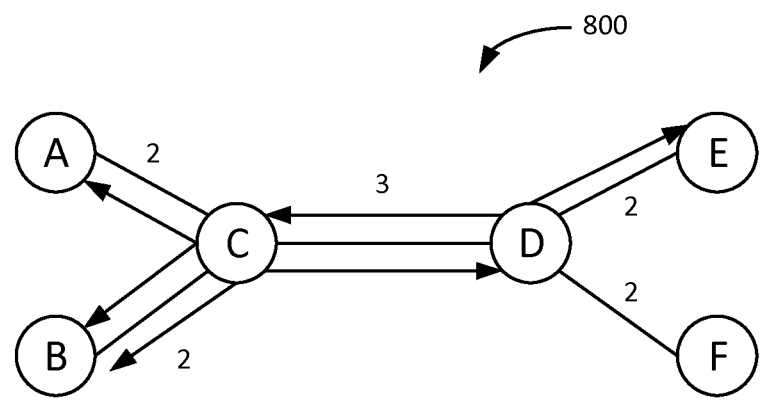
FIG. 8A illustrates the example network map of FIG. 7A with a first mapping solution for the three example VON requests of FIGS. 7B-7D.
Figure 8B:
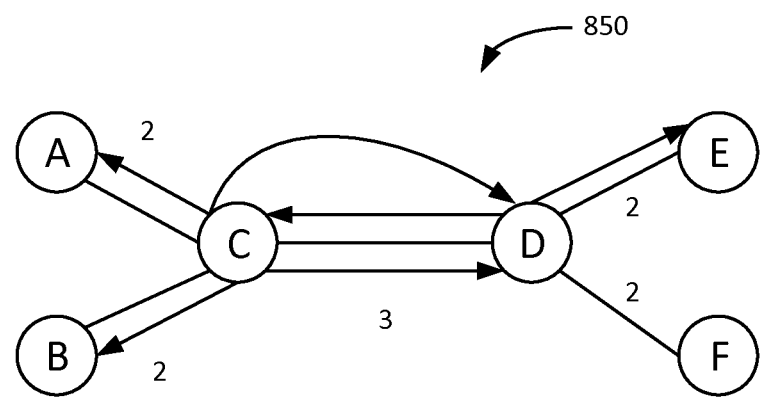
FIG. 8B illustrates the example network map of FIG. 7A with a second mapping solution for the three example VON requests of FIGS. 7B-7D.

Thus, two possible mapping solutions may be returned from the first step of the problem (discussed above with reference to FIGS. 2A-6B) given the physical network 700 and the three VON requests of FIGS. 7A-7D. The mapping solutions may include one mapping pattern for each of the VON requests that includes an ordered list of physical nodes in the physical network 700. Each physical node in the ordered list may be connected to its adjacent physical nodes in the ordered list by physical links in the physical network 700. The two possible mapping solutions are listed in Table 3 below and illustrated in FIGS. 8A and 8B with arrows representing virtual links mapped onto the physical network 700 for each of the two mapping solutions. FIG. 8A illustrates the first mapping solution and FIG. 8B illustrates the second mapping solution.

TABLE 3

Possible mapping solutions.

| Mapping Solutions | VON[0] | VON[1] | VON[2] |
|---|---|---|---|
| Mapping Solution #1 | (A-C-B) | (B-C-D) | (C-D-E) |
| Mapping Solution #2 | (A-C-D) | (B-C-D) | (C-D-E) |

The two possible mapping solutions may be further evaluated in a second step of the problem that deals with slot assignment constraints, as will now be discussed in more detail.

Inequality constraint equations may be formulated for each virtual link of a VON request based on physical links that are shared by multiple virtual links. The inequality constraint equations may require each virtual link that traverses a shared physical link to occupy a unique slot over the shared physical link, thus enforcing a slot continuity constraint. For example, inequality constraint equations for the first mapping solution may include the following: {(MN_0 !=XY_1); (XY_1 !=PQ_2)}, where MN_0 may represent a slot position assigned to the virtual link M-N 722 of VON[0], XY_1 may represent a slot position assigned to the virtual link X-Y 732 of VON[1], and PQ_2 may represent a slot position assigned to the virtual link P-Q 742 of VON[2]. These constraint equations state that two virtual links sharing a physical link may not occupy the same slot according to the slot continuity constraint.

Range constraint equations may be formulated for each virtual link of a VON request based on available optical transmission slots that are common to physical links provisioned for the virtual link. For example, range constraint equations for the first mapping solution may include the following: {(0<=MN_0<=1); (0<=XY_1<=1); (0<=PQ_2<=1)}. The inequality and range constraint equations together may require each virtual link to occupy the same optical transmission slot across all physical links that are traversed by each virtual link.

The above inequality and range constraint equations may be sent to an SMT solver, which may return two valid slot assignment solutions for the first mapping solution, namely: {MN_0=1; XY_1=0; PQ_2=1} and {MN_0=0; XY_1=1; PQ_2=0}.

Similarly, inequality and range constraint equations may be formulated for the second mapping solution: {(MN_0 !=XY_1); (XY_1 !=PQ_2); (MN_0 !=PQ_2)} and {(0<=MN 0<=1); (0<=XY_1<=1); (0<=PQ_2<=1)}. These constraint equations may be sent to the SMT solver. However, the SMT solver would return an infeasible problem determination because no solution exists that would satisfy all of the constraint equations of the second mapping solution. Therefore, the slot continuity constraint cannot be met by this mapping solution.

Returning to the first mapping solution which returned two valid slot assignment solutions, {MN_0=1; XY_1=0; PQ_2=1} and {MN_0=0; XY_1=1; PQ_2=0}, the question now becomes, which of these two valid slot assignment solutions is more optimal? A slot assignment solution with a lowest slot fragmentation cost (i.e., the assigned slots are "packed" as low as possible) may be the optimal slot assignment solution.

A slot fragmentation cost may be calculated for a slot assignment solution by summing each optical transmission slot position that is occupied in each physical link by each virtual link of each VON request in a mapping solution. For the first slot assignment solution {MN_0=1; XY_1=0; PQ_2=1}: virtual link M-N 722 of VON[0] occupies slot position 1 from A to C and slot position 1 from C to B; virtual link X-Y 732 of VON[1] occupies slot position 0 from B to C and slot position 0 from C to D; and virtual link P-Q 742 of VON[2] occupies slot position 1 from C to D and slot position 1 from D to E. Accordingly, summing all of the slot positions yields a slot fragmentation cost of 1+1+0+0+1+1=4. For the second slot assignment solution {MN_0=0; XY_1=1; PQ_2=0}: virtual link M-N 722 of VON[0] occupies slot position 0 from A to C and slot position 0 from C to B; virtual link X-Y 732 of VON[1] occupies slot position 1 from B to C and slot position 1 from C to D; and virtual link P-Q 742 of VON[2] occupies slot position 0 from C to D and slot position 0 from D to E. Accordingly, summing all of the slot positions yields a slot fragmentation cost of 0+0+1+1+0+0=2. Accordingly, the second slot assignment solution is more optimal than the first slot assignment solution.

In some embodiments, the slot fragmentation cost optimization process may be automated by formulating one or more cost constraint equations. For example, a theoretical minimum slot fragmentation cost may be calculated for a given mapping solution by assuming that for each physical link, the virtual links running through it may be packed into the lowest possible available optical transmission slots, then summing each of the slot positions occupied in each physical link by each virtual link. Given this assumption, the first mapping solution would yield a theoretical minimum slot fragmentation cost of: 0+0+1+0+1+0=2. If the slot fragmentation cost of a current slot assignment solution is greater than the theoretical minimum slot fragmentation cost, then a more optimal slot assignment solution may be sought by performing a binary search in the range of slot fragmentation costs spanning the current slot fragmentation cost and the theoretical minimum slot fragmentation cost. A cost constraint equation may be formulated by creating a slot summation for each optical transmission slot position occupied in each physical link by each virtual link of each VON request and constraining the slot summation to lie within a certain range of values. For example, the slot summation may be constrained to be less than or equal to $SF_C-\frac{1}{2}*(SF_C-MSF_c)$, where $SF_C$ is the slot fragmentation cost of the current slot assignment solution and $MSF_c$ is the theoretical minimum slot fragmentation cost. For example, a slot summation for the first mapping solution may be: (2*MN_0+2*XY_1+2*PQ_2), which may be constrained to be less than or equal to $SF_C-\frac{1}{2}*(SF_C-MSF_c)=4-\frac{1}{2}*(4-2)=3$ for the first slot assignment solution. Accordingly, the cost constraint equation would be: (2*MN_0+2*XY_1+2*PQ_2)<=3. The inequality constraint equations, range constraint equations, and cost constraint equation may be sent to the SMT solver to see if any other slot assignment solutions exist with a slot fragmentation cost of three or less. In this example, the SMT solver would return the second slot assignment solution which has a slot fragmentation cost of two. In general, this process may be iterated multiple times to obtain one or more tighter slot assignment solutions and to find a best slot assignment solution based on the one or more tighter slot assignment solutions.

Alternatively, if the SMT solver returned an answer stating that the previous set of constraints was unsatisfiable, the bound used for the cost constraint equation may be relaxed by constraining a slot summation to be less than or equal to a slot fragmentation cost decreased by $\frac{1}{2}*(SF_C-LF_c)$, where $SF_C$ is the slot fragmentation cost of the current slot assignment solution and $LF_c$ is a bound used in the cost constraint equation in a previous SMT problem. For example, if the SMT solver had deemed an SMT problem with a cost constraint equation of: (2*MN_0+2*XY_1+2*PQ_2)<=3 to be unsatisfiable, a revised constraint equation may be constructed using a previous bound $LF_c=3$ and calculating $SF_C-\frac{1}{2}*(SF_C-LF_c)=4-\frac{1}{2}*(4-3)=3.5$, which may be rounded up to 4. This would result in a revised cost constraint equation of (2*MN_0+2*XY_1+2*PQ_2)<=4. However, since our first slot assignment solution already had a cost of 4, the binary search may end at this point signifying that a slot assignment solution with a more optimal slot fragmentation cost, than the one first obtained, may not possible. In general, this process may be iterated multiple times with different values of bounds for the cost constraint equation to find a solution with an optimal slot fragmentation cost that results in a lowest slot fragmentation cost.

Figure 9:
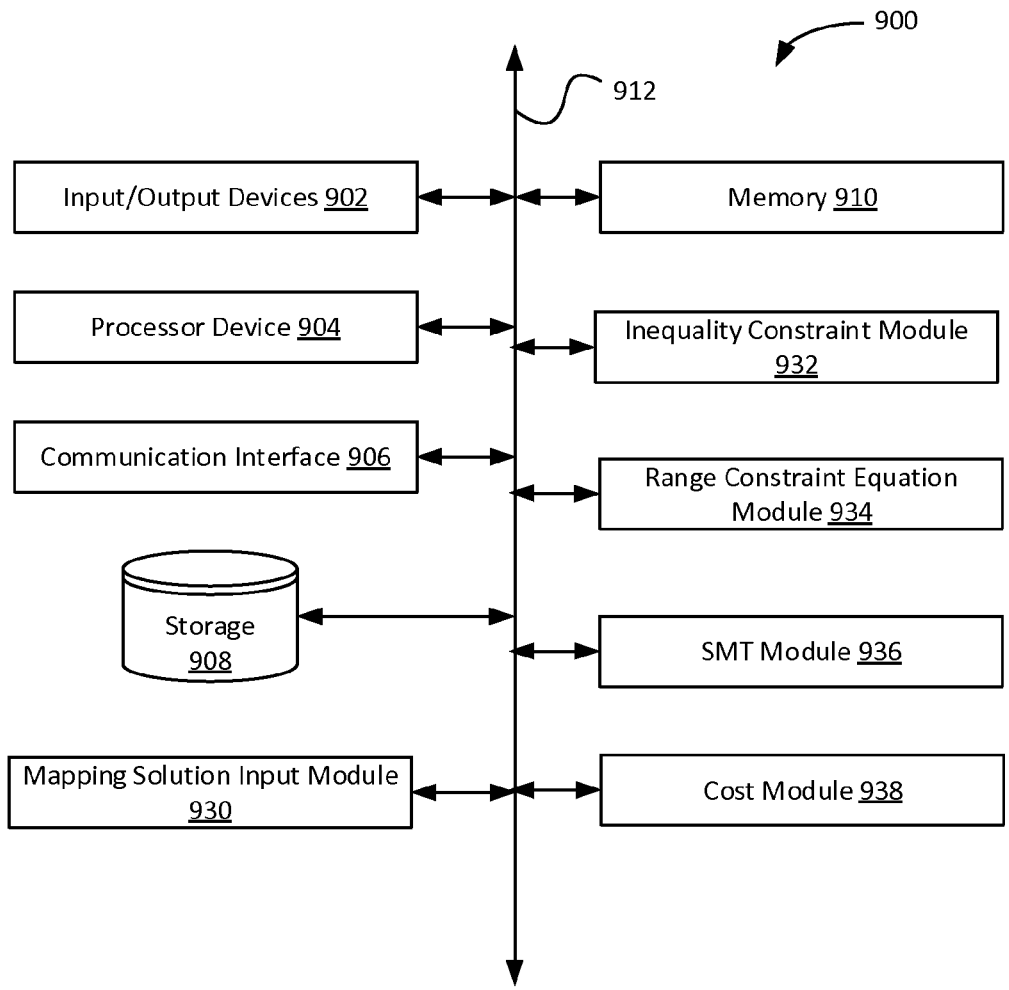
FIG. 9 is a block diagram illustrating an example system to identify slot assignment solutions for one or more VON requests.

FIG. 9 is a block diagram illustrating an example system 900 to identify slot assignment solutions for one or more VON requests, arranged in accordance with at least some embodiments described herein. The system 900 may be implemented as a computing device having any suitable form factor, such as a server computer, a desktop computer, a laptop, a tablet device, or other suitable computing device. The system 900 may include one or more input/output devices 902, a processor device 904, a communication interface 906, a storage 908, a memory 910, a mapping solution input module 930, an inequality constraint module 932, a range constraint equation module 934, an SMT module 936, and a cost module 938 (collectively referred to herein as "slot assignment modules"), according to some examples. The components of the system 900 may be communicatively coupled by a bus 912. The bus 912 may include one or more of: a memory bus, a storage interface bus, a bus/interface controller, an interface bus, or other suitable bus.

The processor device 904 may include an arithmetic logic unit, a microprocessor, a general-purpose controller, or some other processor or processor array to perform or control performance of operations as described herein. The processor device 904 may process data signals and may include various computing architectures including a complex instruction set computer (CISC) architecture, a reduced instruction set computer (RISC) architecture, or an architecture implementing a combination of instruction sets. Although FIG. 4 includes a single processor device 404, multiple processor devices may be included.

The communication interface 906 may be configured to receive and/or transmit data to and from other computing devices (not shown), such as mapping solution data. In some implementations, the communication interface 906 includes a port for direct physical connection to a communication channel (not shown) associated with other computing devices. For example, the communication interface 906 may include a universal serial bus (USB) port, a secure digital (SD) port, a category 5 cable (CAT-5) port, or similar port for wired communication with other computing devices. The communication interface 906 may also provide other connections to a network (not shown) for data communication using standard network protocols including transmission control protocol/internet protocol (TCP/IP), HTTP, HTTP secure (HTTPS), and simple mail transfer protocol (SMTP), etc. In some implementations, the communication interface 906 may include a wireless transceiver (not shown) for exchanging data with other computing devices. In these and other embodiments, the transceiver may use one or more wireless communication methods, including IEEE 802.11, IEEE 802.16, Bluetooth®, Bluetooth Low Energy®, Bluetooth SMART®, Wi-Fi, cellular, Near Field communications, ZigBee, or any other suitable wireless communication method to communicate with other computing devices.

The storage 908 may include a non-transitory storage medium that stores instructions and/or data for providing the functionality described herein. The storage 908 may include a dynamic random access memory (DRAM) device, a static random access memory (SRAM) device, flash memory, or some other memory devices. In some implementations, the storage 908 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The storage 908 may also store instructions and/or data that are temporarily stored or loaded into the memory 910.

The memory 910 may store instructions or data that may be executed or operated on by the processor device 904. The instructions or data may include programming code that may be executed by the processor device 904 to perform or control performance of the operations described herein. The memory 910 may include a dynamic random access memory (DRAM) device, a static random access memory (SRAM) device, flash memory, or some other memory device. In some implementations, the memory 910 may include a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis. The memory 910 and/or storage 908 may store data including, but not limited to, data related to one or more VON requests.

The slot assignment modules may generally include software that includes programming code and/or computer-readable instructions executable by the processor device 904 to perform or control performance of the functions and operations described herein. The slot assignment modules may receive data from each other or from another one of the components of the system 900 and may store data in one or both of the storage 908 and the memory 910.

In certain embodiments, the system 900 may be configured to interface with a user (not shown) and receive data about an optical signal transmission path. For example, the system 900 may include and/or may be coupled to one or more input/output devices 902 to facilitate receiving data about an optical signal transmission path from the user and/or outputting results to the user. The one or more input/output devices (not shown) may include, but are not limited to, a keyboard, a mouse, a touchpad, a microphone, a display, a touchscreen display, an audio speaker, or the like. Alternately or additionally, the system 900 may be configured to receive data about an optical signal transmission path from a device such as another computing device and/or a network element (not shown).

An example implementation of the system 900 will now be discussed with reference to FIG. 9. The mapping solution input module may be configured to receive one or more mapping solutions for further analysis regarding slot assignments for the one or more mapping solutions. The mapping solutions may include one mapping pattern for each of the one or more VON requests and each mapping pattern may be an ordered list of physical nodes, where each physical node in the ordered list is connected to adjacent physical nodes in the ordered list by physical links in the physical network.

The inequality constraint module 932 may be configured to formulate inequality constraint equations based on physical links that are shared by multiple Virtual links in a mapping solution. The inequality constraint equations may require each Virtual link that traverses a shared physical link to occupy a unique optical transmission slot over the shared physical link.

The range constraint module 932 may be configured to formulate range constraint equations for each Virtual link in a mapping solution based on available optical transmission slots that are common to physical links provisioned for the virtual link.

The SMT module 936 may be configured to receive the inequality and range constraint equations and solve these equations according to one or more satisfiability modulo theories to determine one or more valid slot assignment solutions for the mapping solution or an infeasible problem determination.

The cost module 938 may be configured to calculate a current slot fragmentation cost for a slot assignment solution by summing each slot position that is occupied in each physical link by each Virtual link. The cost module 938 may also be configured to calculate a theoretical minimum slot fragmentation cost by assuming that virtual links assigned to each physical link may be assigned to their lowest available optical transmission slots, utilizing a lowest available set of optical transmission slots for the set of virtual links assigned to a physical link and summing each of the optical transmission slot positions occupied in each physical link by each Virtual link. If the current slot fragmentation cost exceeds the theoretical minimum slot fragmentation cost, the cost module 938 may be configured to formulate a cost constraint equation by creating a slot summation for each optical transmission slot position occupied in each physical link by each virtual link and constraining the slot summation to be less than or equal to a bound $SF_C - \frac{1}{2}*(SF_C - MSF_c)$, where $SF_C$ is the current slot fragmentation cost and $MSF_c$ is the theoretical minimum slot fragmentation cost. The cost module 938 may send the cost constraint equation to the SMT module 936 to be solved along with the inequality and range constraint equations to obtain one or more tighter slot assignment solutions. The cost module 938 may also be configured to determine a best slot assignment solution based on the one or more or more tighter slot assignment solutions.

The cost module 938 may also be configured to relax the bound of the cost constraint equation by constraining the slot summation to be less than or equal to $SF_C - \frac{1}{2}*(SF_C - LF_c)$, where $SF_C$ is the current slot fragmentation cost and $LF_c$ is a previous bound. The cost module 938 may send the cost constraint equation with the relaxed bound to the SMT module to be solved along with the inequality and range constraint equations to obtain one or more relaxed slot assignment solutions. The cost module 938 may also be configured to determine a best relaxed slot assignment solution based on the one or more or more relaxed slot assignment solutions.

Figure 10A:
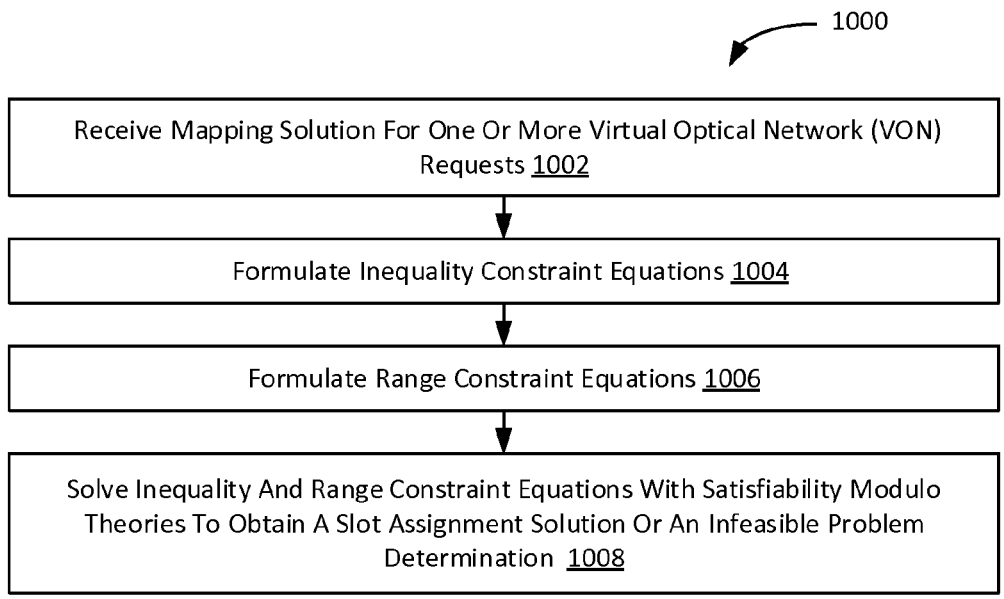
FIG. 10A is an example flow diagram illustrating a method of obtaining slot assignment solutions for mapping solutions.

FIG. 10A shows an example flow diagram of a method 1000 of obtaining slot assignment solutions for mapping solutions, arranged in accordance with at least one embodiment described herein. The method 1000 may be implemented, in whole or in part, by the system 900 of FIG. 9, or another suitable device or system. The method 1000 may begin at block 1002.

In block 1002 ("Receive Mapping Solution For One Or More Virtual Optical Network (VON) Requests"), a mapping solution for one or more virtual optical network (VON) requests may be received. The mapping solution may include one mapping pattern for each of the one or more VON requests. Each mapping pattern may include an ordered list of physical nodes where each physical node in the ordered list is connected to adjacent physical nodes in the ordered list by physical links. Block 1002 may be followed by block 1004.

In block 1004 ("Formulate Inequality Constraint Equations"), inequality constraint equations may be formulated based on physical links that are shared by multiple virtual links of multiple VON requests. The inequality constraint equations may require that each virtual link that traverses a shared physical link occupy a unique slot over the shared physical link. Block 1004 may be followed by block 1006.

In block 1006 ("Formulate Range Constraint Equations"), range constraint equations may be formulated based on examining the physical links traversed by each virtual link and determining the set of common available optical transmission slots over all these physical links. The inequality and range constraint equations may together require each Virtual link to occupy a same optical transmission slot across all physical links traversed by the Virtual link. Block 1006 may be followed by block 1008.

In block 1008 ("Solve Inequality And Range Constraint Equations With Satisfiability Modulo Theories To Obtain A Slot Assignment Solution Or An Infeasible Problem Determination"), the inequality and range constraint equations may be solved according to one or more satisfiability modulo theories to obtain one of a slot assignment solution or an infeasible problem determination.

Figure 10B:
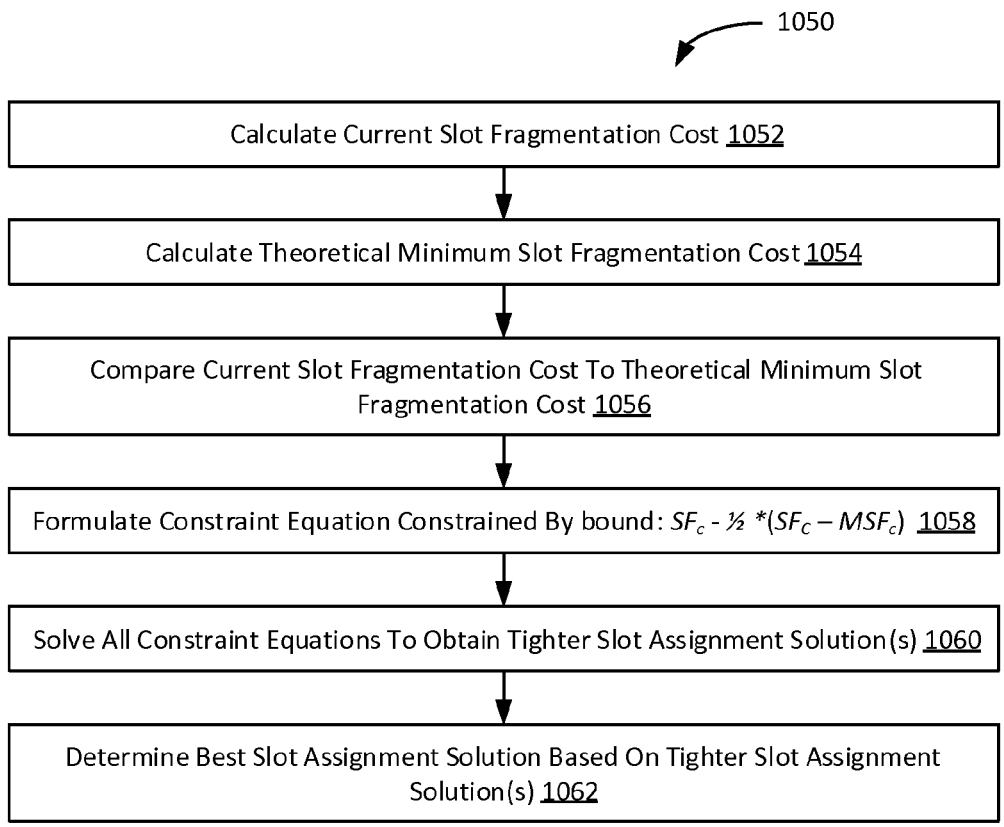
FIG. 10B is an example flow diagram illustrating a method of obtaining a best slot assignment solution based on one or more tighter slot assignment solutions.

FIG. 10B shows an example flow diagram of a method 1050 of obtaining a best slot assignment solution based on one or more tighter slot assignment solutions, arranged in accordance with at least one embodiment described herein. The method 1050 may be implemented, in whole or in part, by the system 900 of FIG. 9, or another suitable device or system. The method 1050 may begin at block 1052.

In block 1052 ("Calculate Current Slot Fragmentation Cost"), a current slot fragmentation cost for a slot assignment solution may be calculated by summing each optical transmission slot position that is occupied in each physical link by each Virtual link. Block 1052 may be followed by block 1054.

In block 1054 ("Calculate Theoretical Minimum Slot Fragmentation Cost"), a theoretical minimum slot fragmentation cost may be calculated for a mapping solution by assuming that virtual links assigned to each physical link may be assigned to their lowest available optical transmission slots, utilizing a lowest available set of optical transmission slots for the set of virtual links assigned to a physical link, and summing each of the optical transmission slot positions occupied in each physical link by each Virtual link. Block 1054 may be followed by block 1056.

In block 1056 ("Compare Current Slot Fragmentation Cost To Theoretical Minimum Slot Fragmentation Cost"), the current slot fragmentation cost may be compared to the theoretical minimum slot fragmentation cost. Block 1056 may be followed by block 1058.

In block 1058 ("Formulate Constraint Equation Constrained By Bound: $SF_c-\frac{1}{2}*(SF_c-MSF_c)$"), one or more cost constraint equations may be formulated by creating a slot summation for each slot position occupied in each physical link by each virtual link and constraining the slot summation to be less than or equal to $SF_c-\frac{1}{2}*(SF_c-MSF_c)$, where $SF_c$ is the current slot fragmentation cost and $MSF_c$ is the theoretical minimum slot fragmentation cost. Block 1058 may be followed by block 1060.

In block 1060 ("Solve All Constraint Equations To Obtain Tighter Slot Assignment Solution(s)"), the inequality constraint equations, the range constraint equations, and the constraint equation may be solved according to one or more satisfiability modulo theories to obtain one or more tighter slot assignment solutions. Block 1060 may be followed by block 1062.

In block 1062 ("Determine Best Slot Assignment Solution Based On Tighter Slot Assignment Solution(s)"), a best slot assignment solution may be determined based on the one or more or more tighter slot assignment solutions with a lowest slot fragmentation cost.

Figure 11A:
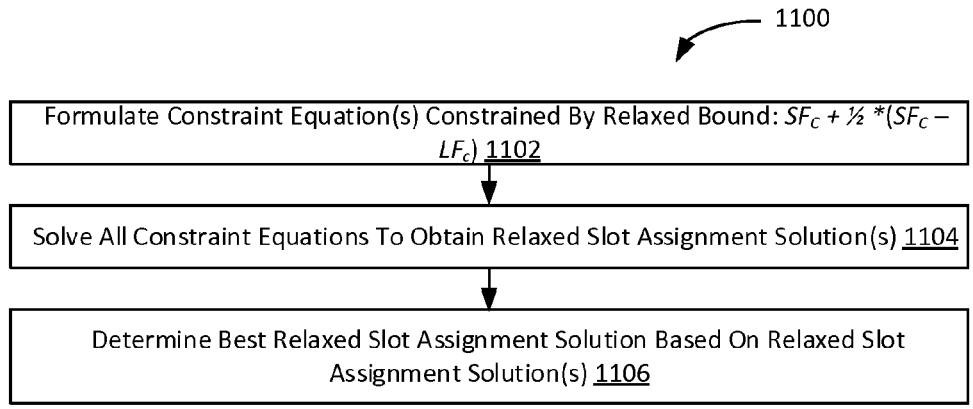
FIG. 11A is an example flow diagram illustrating a method of obtaining a best relaxed slot assignment solution based on one or more relaxed slot assignment solutions.

FIG. 11A shows an example flow diagram of a method 1100 of obtaining a best relaxed slot assignment solution based on one or more relaxed slot assignment solutions, arranged in accordance with at least one embodiment described herein. The method 1100 may be implemented, in whole or in part, by the system 900 of FIG. 9, or another suitable device or system. The method 1100 may begin at block 1102.

In block 1102 ("Formulate Constraint Equation Constrained By Relaxed Bound: $SF_c-\frac{1}{2}*(SF_c-LF_c)$"), the bound may be relaxed by constraining the slot summation to be less than or equal to $SF_c-\frac{1}{2}*(SF_c-LF_c)$, where $SF_c$ is the current slot fragmentation cost and $LF_c$ is a previous bound. Block 1102 may be followed by block 1104.

In block 1104 ("Solve All Constraint Equations To Obtain Relaxed Slot Assignment Solution(s)"), the inequality constraint equations, the range constraint equations, and the cost constraint equation with a relaxed bound may be solved according to one or more satisfiability modulo theories to obtain one or more relaxed slot assignment solutions. Block 1104 may be followed by block 1106.

In block 1106 ("Determine Best Relaxed Slot Assignment Solution Based On Relaxed Slot Assignment Solution(s)"), a best relaxed slot assignment solution may be determined based on the one or more or more relaxed slot assignment solutions with a lowest slot fragmentation cost.

Figure 11B:
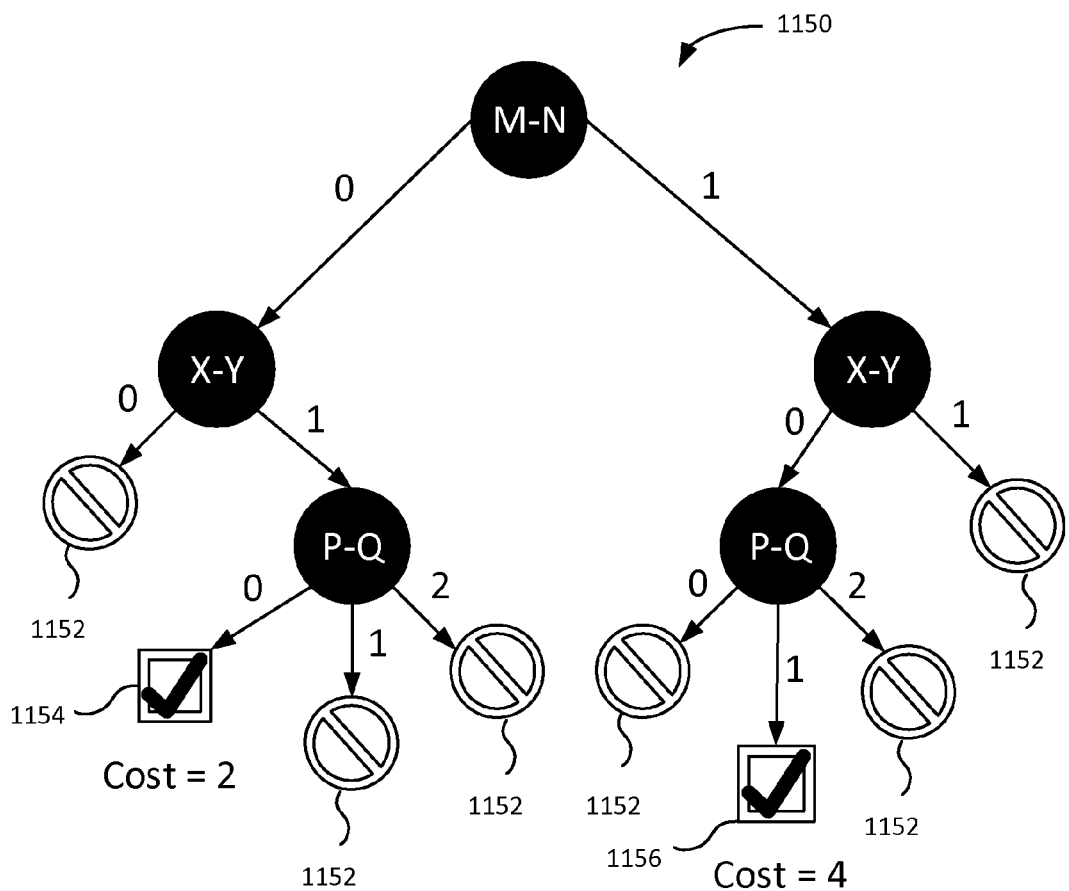
FIG. 11B illustrates a branch and bound search tree of the first mapping solution of FIG. 8A.

FIGS. 11B-13B illustrate an alternative method for determining optimal slot assignment solutions for mapping solutions utilizing a branch and bound search process. FIG. 11B illustrates an example branch and bound search tree 1150 of the first VON mapping solution previously discussed above with reference to FIG. 8A and Table 3. The branch and bound search tree 1150 may include nodes representing slot assignment choices made for specific virtual links of the first mapping solution (M-N, X-Y, P-Q). The virtual links of these mapping patterns may be assigned to slot positions (indicated by the numbers next to the arrows). The branch and bound search tree 1150 may include invalid nodes 1152, which indicate slot assignments that violate slot continuity constraints and result in invalid slot assignment solutions. The branch and bound search tree 1150 may also include nodes 1154 and 1156 which indicate valid slot assignment solutions.

The virtual link M-N of the first mapping solution may be an unassigned virtual link that is selected and assigned to slot position zero creating a branch on the left side of node M-N labeled with a 0. Virtual link M-N may be identified as a last assigned virtual link. Virtual link X-Y may be an unassigned virtual link that may be selected next and assigned to slot position zero creating a branch on the left side of node X-Y labeled with a 0. Virtual link X-Y may be identified as the last assigned virtual link. However, this slot assignment would violate slot continuity constraints because virtual links M-N and X-Y share a physical link, and therefore cannot occupy the same slot position (in this case 0). Therefore, an invalid node 1152 may be added to this branch to indicate that the bounding criteria has been met and this is not a valid slot assignment. However, node X-Y has an untried slot position, which is 1, so virtual link X-Y may be assigned to slot position 1 and it may be determined if the slot continuity constraint has been violated. In this case, slot position 1 is a valid choice for virtual link X-Y because virtual links X-Y and M-N occupy different slot positions along their shared physical link. The next unassigned virtual link P-Q may be selected and assigned to slot position 0. Virtual link P-Q may be identified as the last assigned virtual link. It may then be determined if the slot continuity constraint has been violated for this slot assignment. In this case, slot position 0 is a valid choice for P-Q because virtual links X-Y, M-N, and P-Q all occupy different slot positions along their shared physical links. This process may continue in like manner for each untried slot position for each virtual link node. Once each possible slot position has been tried for the last assigned virtual link, the assignment may be undone for that virtual link node and the previously assigned virtual link may become the last assigned virtual link. In this manner, the process may "back track" through the branch and bound search tree 1150 to identify additional untried slots for virtual link nodes and complete the branch and bound search tree 1150. Moreover, slot fragmentation costs may also be determined for identified slot assignment solutions utilizing techniques similar to those discussed above.

Figure 12:
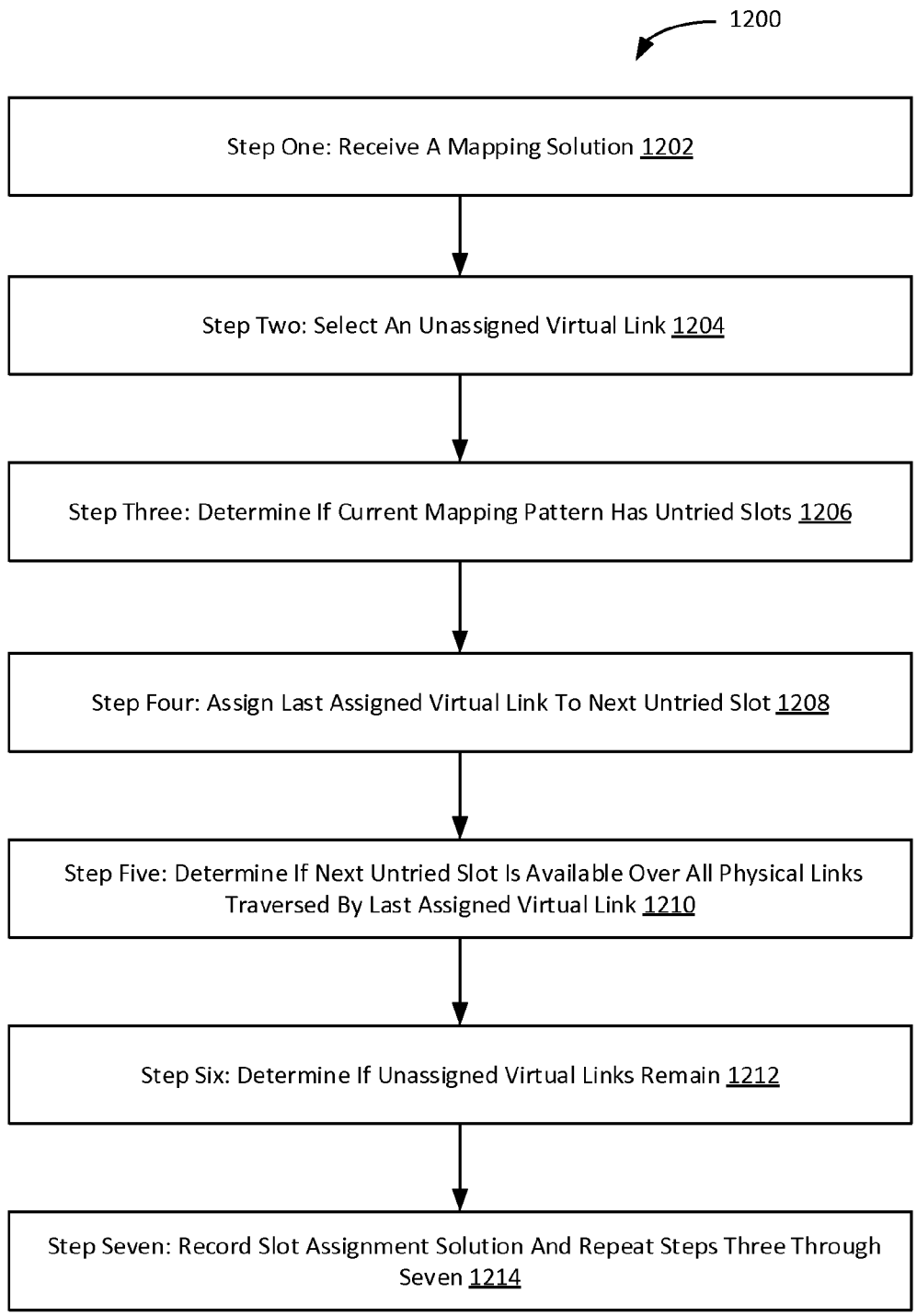
FIG. 12 is an example flow diagram illustrating a method of obtaining slot assignment solutions utilizing a branch and bound search tree of a mapping solution.

FIG. 12 shows an example flow diagram of a method 1200 of obtaining slot assignment solutions utilizing a branch and bound search process of a mapping solution, arranged in accordance with at least one embodiment described herein. The method 1200 may begin at block 1202.

In block 1202 ("Step One: Receive A Mapping Solution"), a mapping solution for one or more virtual optical network (VON) requests may be received, the one or more VON requests including virtual nodes and virtual links. The mapping solution may include one mapping pattern for each of the one or more VON requests. Each mapping pattern may include an ordered list of physical nodes connected to adjacent physical nodes in the ordered list by physical links in a physical network. Block 1202 may be followed by block 1204.

In block 1204 ("Step Two: Select An Unassigned Virtual Link"), an unassigned virtual link may be selected, assigned, and identified as a last assigned virtual link. Block 1204 may be followed by block 1206.

In block 1206 ("Step Three: Determine If Last Assigned Virtual Link Has Untried Slots"), it may be determined whether the last assigned virtual link has any untried slot positions. Block 1206 may be followed by block 1208.

In block 1208 ("Step Four: Assign Last Assigned Virtual Link To Next Untried Slot"), if it is determined that the last assigned virtual link has untried slot positions, a next untried slot position may be assigned to the last assigned virtual link. Block 1208 may be followed by block 1210.

In block 1210 ("Step Five: Determine If Next Untried Slot Is Available Over All Physical Links Traversed By Last Assigned Virtual Link"), it may be determined whether the next untried slot position that was assigned to the last assigned virtual link is available over all physical links traversed by the last assigned virtual link. Block 1210 may be followed by block 1212.

In block 1212 ("Step Six: Determine If Unassigned Virtual Links Remain"), assuming that the next untried slot assigned to the last assigned virtual link is available over all physical links traversed by the last assigned virtual link, it may be determined whether any unassigned virtual links remain. If it is determined that unassigned virtual links remain, steps two through seven may be repeated and slot fragmentation costs for a current partial slot assignments may be calculated and compared to a slot fragmentation cost of a previously found complete slot assignment. If it is determined that a slot fragmentation cost for a current partial slot assignment exceeds a slot fragmentation cost of a previously found complete slot assignment, the search may be bound at this point. Block 1212 may be followed by block 1214.

In block 1214 ("Step Seven: Record Slot Assignment Solution And Repeat Steps Three Through Seven"), if no unassigned virtual links remain, then the branch has been exhausted and a solution may be recorded. The method 1200 may then jump to step three and repeat the steps from this point.

Figure 13A:
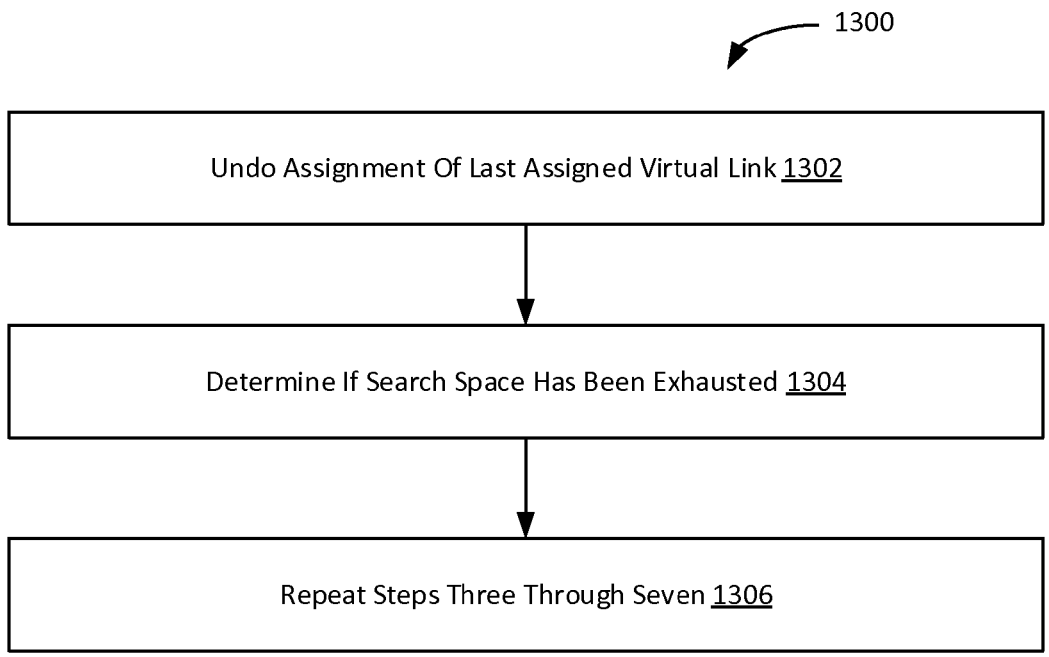
FIG. 13A is an example flow diagram illustrating a method of backtracking through a branch and bound search tree to identify additional untried slots.

FIG. 13A shows an example flow diagram of a method 1300 of backtracking through a branch and bound search tree to identify additional untried slots that may be utilized with the method of FIG. 12, arranged in accordance with at least one embodiment described herein. The method 1300 may begin at block 1302.

In block 1302 ("Undo Assignment Of Last Assigned Virtual Link"), if it is determined that the last assigned virtual link does not have any untried slot, then the assignment of the last assigned virtual link may be undone and the previously assigned virtual link may become the last assigned virtual link. This may allow the method to "backtrack" up the branch and bound tree to find other untried slot positions for previously selected virtual link nodes. Block 1302 may be followed by block 1304.

In block 1304 ("Determine If Search Space Has Been Exhausted"), it may be determined whether a search space has been exhausted. Block 1304 may be followed by block 1306.

In block 1306 ("Repeat Steps Three Through Seven"), if the search space has not been exhausted, the method may jump to step three and repeat the process. If the search space has been exhausted, it may be determined whether one or more slot assignment solutions have been recorded. If not slot assignment solution was recorded, then an indication that no slot assignment solution exists may be asserted. If a slot assignment solution has been recorded, then the recorded slot assignment solutions may be searched for a best slot assignment solution based on a lowest slot fragmentation cost. Furthermore, if no slot assignment solution was recorded, then partial slot assignment solutions may be searched for which allow a greatest number of VON requests to be provisioned. Alternatively, or additionally, a branch and bound search may be time limited and may return a best solution for a given time period without exhausting all possible slot assignment solutions.

Figure 13B:
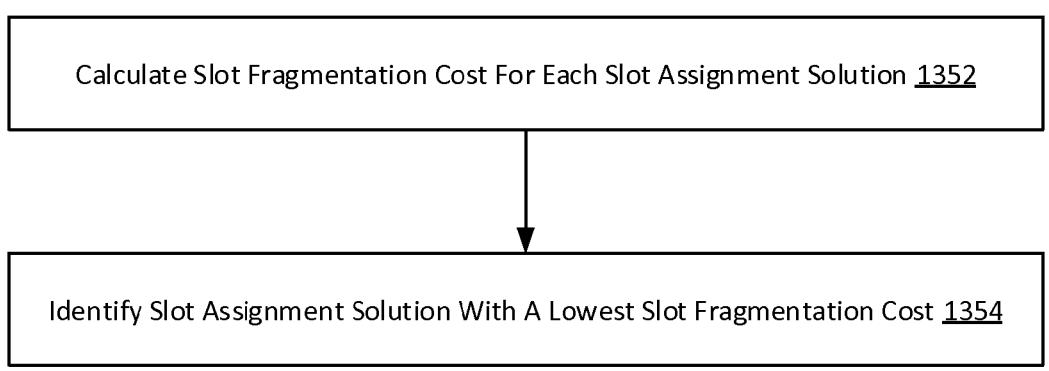
FIG. 13B is an example flow diagram illustrating a method of identifying a slot assignment solution with a lowest slot fragmentation cost.

FIG. 13B shows an example flow diagram of a method 1350 of identifying a slot assignment solution with a lowest slot fragmentation cost, arranged in accordance with at least one embodiment described herein. The method 1350 may begin at block 1352.

In block 1352 ("Calculate Slot Fragmentation Cost For Each Slot Assignment Solution"), a slot fragmentation cost for each of the one or more slot assignment solutions may be calculated by summing slot position numbers that are occupied in each physical link by a virtual link of a slot assignment solution. Block 1352 may be followed by block 1354.

In block 1354 ("Identify Slot Assignment Solution With A Lowest Slot Fragmentation Cost"), a slot assignment solution with a lowest slot fragmentation cost may be identified based on the slot fragmentation costs for each slot assignment solution.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it is understood that the various changes, substitutions, and alterations could be made hereto without departing from the spirit and scope of the invention.

What is claimed is:

1. A method of provisioning a network, the method comprising:
    receiving a mapping solution for one or more virtual optical network (VON) requests, the one or more VON requests comprising virtual nodes and virtual links and the mapping solution including one mapping pattern for each of the one or more VON requests, each mapping pattern comprising an ordered list of physical nodes in a physical network where each physical node in the ordered list is connected to adjacent physical nodes in the ordered list by physical links in the physical network and each physical link includes one or more optical transmission slots;
    formulating inequality constraint equations based on physical links that are shared by multiple virtual links, the inequality constraint equations requiring each virtual link that traverses a shared physical link to occupy a unique optical transmission slot over the shared physical link;
    formulating range constraint equations for each virtual link based on available optical transmission slots that are common to physical links provisioned for the virtual link, the inequality and range constraint equations requiring each virtual link to occupy a same optical transmission slot across all physical links traversed by the virtual link; and
    solving the inequality and range constraint equations according to one or more satisfiability modulo theories to obtain one of a slot assignment solution or an infeasible problem determination.

2. The method of claim 1, further comprising:
    in response to obtaining a slot assignment solution, calculating a current slot fragmentation cost for the slot assignment solution by summing each optical transmission slot position that is occupied in each physical link by each virtual link;
    calculating a theoretical minimum slot fragmentation cost by:
        assuming that virtual links assigned to each physical link may be assigned to their lowest available optical transmission slots;
        utilizing a lowest available set of optical transmission slots for each virtual link assigned to a physical link; and
        summing each of the optical transmission slot positions occupied in each physical link by each virtual link;
    comparing the current slot fragmentation cost to the theoretical minimum slot fragmentation cost;
    in response to the current slot fragmentation cost exceeding the theoretical minimum slot fragmentation cost, formulating a cost constraint equation by creating a slot summation for each optical transmission slot position occupied in each physical link by each virtual link and constraining the slot summation to be less than or equal to a bound defined by $SF_C - \frac{1}{2} *(SF_C - MSF_c)$, where $SF_C$ is the current slot fragmentation cost and $MSF_c$ is the theoretical minimum slot fragmentation cost;
    solving the inequality constraint equations, the range constraint equations, and the cost constraint equation according to one or more satisfiability modulo theories to obtain one or more tighter slot assignment solutions; and
    determining a best slot assignment solution based on the one or more tighter slot assignment solutions.

3. The method of claim 2, further comprising:
    in response to receiving an indication that the inequality constraint equations, the range constraint equations, and the constraint equation are unsatisfiable, relaxing the bound of the cost constraint equation by constraining the slot summation to be less than or equal to a relaxed bound defined by $SFc - \frac{1}{2} *(SF_C - LF_C)$, where $SF_c$ is the current slot fragmentation cost and $LF_c$ is a previous bound;
    solving the inequality constraint equations, the range constraint equations, and the cost constraint equation according to one or more satisfiability modulo theories to obtain one or more relaxed slot assignment solutions; and
    determining a best relaxed slot assignment solution based on the one or more relaxed slot assignment solutions.

4. The method of claim 1, wherein the one or more optical transmission slots comprise a first optical transmission slot having a first wavelength and a second optical transmission slot having a second wavelength.

5. The method of claim 1, wherein a number of optical transmission slots used in each physical link by a virtual link is a function of an overall physical length of the virtual link.

6. One or more non-transitory computer-readable media storing one or more programs that are configured, when executed, to cause one or more processors to execute the method as recited in claim 1.

7. A network provisioning system, the system comprising:
a mapping solution input module configured to receive a mapping solution for one or more virtual optical network (VON) requests, the one or more VON requests comprising virtual nodes and virtual links and the mapping solution including one mapping pattern for each of the one or more VON requests, each mapping pattern comprising an ordered list of physical nodes in a physical network where each physical node in the ordered list is connected to adjacent physical nodes in the ordered list by physical links in the physical network and each physical link includes one or more optical transmission slots;
an inequality constraint module executable by a processor to formulate inequality constraint equations based on physical links that are shared by multiple virtual links, the inequality constraint equations requiring each virtual link that traverses a shared physical link to occupy a unique optical transmission slot over the shared physical link;
a range constraint equation module executable by the processor to formulate range constraint equations for each virtual link based on available optical transmission slots that are common to physical links provisioned for the virtual link, the inequality and range constraint equations requiring each virtual link to occupy a same optical transmission slot across all physical links traversed by the virtual link; and
a satisfiability modulo theory (SMT) module executable by the processor to solve the inequality and range constraint equations according to one or more satisfiability modulo theories to obtain one of a slot assignment solution or an infeasible problem determination.

8. The system of claim 7, further comprising a cost module configured to:
calculate a current slot fragmentation cost for the slot assignment solution by summing each optical transmission slot position that is occupied in each physical link by each virtual link;
calculate a theoretical minimum slot fragmentation cost by:
assuming that virtual links assigned to each physical link may be assigned to their lowest available optical transmission slots;
utilizing a lowest available set of optical transmission slots for each virtual link assigned to a physical link; and
summing each of the optical transmission slot positions occupied in each physical link by each virtual link;
compare the current slot fragmentation cost to the theoretical minimum slot fragmentation cost;
formulate a constraint equation when the current slot fragmentation cost exceeds the theoretical minimum slot fragmentation cost by creating a slot summation for each optical transmission slot position occupied in each physical link by each virtual link and constraining the slot summation to be less than or equal to a bound defined by $SF_c - \frac{1}{2}*(SF_c - MSF_c)$, where $SF_c$ is the current slot fragmentation cost and $MSF_c$ is the theoretical minimum slot fragmentation cost;
obtain one or more tighter slot assignment solutions from the SMT module based on the inequality constraint equations, the range constraint equations, and the constraint equation; and
determine a best slot assignment solution based on the one or more tighter slot assignment solutions.

9. The system of claim 8, wherein the cost module is further configured to:
relax the bound when the inequality constraint equations, the range constraint equations, and the constraint equation are unsatisfiable by constraining the slot summation to be less than or equal to $SF_c - \frac{1}{2}*(SF_c - LF_c)$, where $SF_c$ is the current slot fragmentation cost and $LF_c$ is a previous bound;
obtain one or more relaxed slot assignment solutions from the SMT module based on the inequality constraint equations, the range constraint equations, and the constraint equations; and
determine a best relaxed slot assignment solution based on the one or more relaxed slot assignment solutions.

10. The system of claim 7, wherein the one or more optical transmission slots comprise a first optical transmission slot having a first wavelength and a second optical transmission slot having a second wavelength.

11. The system of claim 7, wherein a number of optical transmission slots used in each physical link by a virtual link is a function of an overall physical length of the virtual link.

12. A method of provisioning a network, the method comprising the following steps:
step one: receiving a mapping solution for one or more virtual optical network (VON) requests, the one or more VON requests comprising virtual nodes and virtual links and the mapping solution including one mapping pattern for each of the one or more VON requests, each mapping pattern comprising an ordered list of physical nodes in a physical network where each physical node in the ordered list is connected to adjacent physical nodes in the ordered list by physical links in the physical network, each physical link including one or more slots having a slot position number;
step two: selecting an unassigned virtual link and identifying the unassigned virtual link as a last assigned virtual link;
step three: determining whether the last assigned virtual link has any untried slots;
step four: in response to determining that the last assigned virtual link has untried slots, assigning the last assigned virtual link to a next untried slot;
step five: determining whether the next untried slot assigned to the last assigned virtual link is available over all physical links traversed by the last assigned virtual link;
step six: in response to determining that the next untried slot assigned to the last assigned virtual link is available over all physical links traversed by the last assigned virtual link, determining whether any unassigned virtual links remain; and
step seven: in response to determining that no unassigned virtual links remain, recording a slot assignment solution and repeating steps three through seven.

13. The method of claim 12, further comprising:
in response to determining that the next untried slot assigned to the last assigned virtual link is not available over all physical links traversed by the last assigned virtual link, repeating steps three through seven.

14. The method of claim 12, further comprising:
in response to determining that unassigned virtual links remain, repeating steps two through seven;
calculating a slot fragmentation cost for a current partial slot assignment; and in response to determining that the slot fragmentation cost for the current partial slot assignment exceeds a slot fragmentation cost of a previously found complete slot assignment, bounding a search branch.

15. The method of claim 12, further comprising:
in response to determining that the last assigned virtual link does not have any untried slots:
undoing the assignment of the last assigned virtual link;
determining whether a search space has been exhausted; and
in response to determining that the search space has not been exhausted, repeating steps three through seven.

16. The method of claim 15, further comprising:
in response to determining that the search space has been exhausted, determining whether one or more slot assignment solutions have been recorded.

17. The method of claim 16, further comprising:
in response to determining that no slot assignment solution has been recorded, generating an indication that no complete slot assignment solution exists for the mapping solution.

18. The method of claim 16, further comprising:
in response to determining that one or more slot assignment solutions have been recorded:
calculating a slot fragmentation cost for each of the one or more slot assignment solutions by summing slot position numbers that are occupied in each physical link by each virtual link of a slot assignment solution; and
identifying a slot assignment solution with a lowest slot fragmentation cost.

19. The method of claim 16, further comprising:
in response to determining that no slot assignment solution has been recorded, analyzing the search space for a partial slot assignment solution which allows a greatest number of VON requests to be provisioned to the physical network.

20. One or more non-transitory computer-readable media storing one or more programs that are configured, when executed, to cause one or more processors to execute the method as recited in claim 12.

* * * * *